United States Patent
Oliveira Almeida et al.

(10) Patent No.: US 11,809,499 B2
(45) Date of Patent: Nov. 7, 2023

(54) MACHINE LEARNING SEGMENTATION METHODS AND SYSTEMS

(71) Applicant: Kinaxis Inc., Ottawa (CA)

(72) Inventors: Marcio Oliveira Almeida, Stittsville (CA); Seyednaser Nourashrafeddin, Ottawa (CA); Jean-François Dubeau, Ottawa (CA); Ivy Blackmore, Ottawa (CA); Zhen Lin, Kanata (CA)

(73) Assignee: Kinaxis Inc., Ottawa (CA)

( * ) Notice: Subject to any disclaimer, the term of this patent is extended or adjusted under 35 U.S.C. 154(b) by 0 days.

(21) Appl. No.: 16/848,266

(22) Filed: Apr. 14, 2020

(65) Prior Publication Data

US 2021/0109969 A1 Apr. 15, 2021

Related U.S. Application Data

(63) Continuation-in-part of application No. 16/837,182, filed on Apr. 1, 2020, now Pat. No. 11,537,825, and
(Continued)

(51) Int. Cl.
*G06Q 10/06* (2023.01)
*G06Q 30/02* (2023.01)
(Continued)

(52) U.S. Cl.
CPC .......... *G06F 16/906* (2019.01); *G06F 18/251* (2023.01); *G06N 20/00* (2019.01)

(58) Field of Classification Search
CPC ......... G06Q 10/06; G06Q 30/02; G06Q 30/06
(Continued)

(56) References Cited

U.S. PATENT DOCUMENTS 7,257,513 B2 8/2007 Brendon
7,792,353 B2 9/2010 Forman et al.
(Continued)

FOREIGN PATENT DOCUMENTS

CA 3057521 A1 9/2018
JP 2018147261 A 9/2018
WO 2019055957 A1 3/2019

OTHER PUBLICATIONS

Sherkat, et al., "Interactive Document Clustering Revisited: A Visual Analytics Approach". IUI 2018: 23rd International Conference on Intelligent User Interfaces, Mar. 11, 2018 (Nov. 3, 2018),pp. 281-292, ISSN DOI: 10.1145/3172944.3172964 [ online] [retrieved on Dec. 10, 2020 (Oct. 12, 2020)]. Retrieved from the Internet: <https://dl.acm.org/doi/10.ll 45/3172944.3172964>.
(Continued)

*Primary Examiner* — Nga B Nguyen
(74) *Attorney, Agent, or Firm* — Borden Ladner Gervais LLP

(57) ABSTRACT

Machine learning segmentation methods and systems that perform segmentation quickly, efficiently, cheaply, and optionally provides an interactive feature that allows a user to alter the segmentation until a desired result is obtained. The automated machine learning segmentation tool receives all potentially important attributes and provides segmentation of items. It also receives information about important features of the data and finds how best to differentiate between groups using cluster-based machine learning algorithms. In addition, visualization of the segmentation explains to a user how the segmentation was obtained.

21 Claims, 24 Drawing Sheets

Related U.S. Application Data a continuation-in-part of application No. 16/697,620, filed on Nov. 27, 2019, said application No. 16/837,182 is a continuation-in-part of application No. 16/599,143, filed on Oct. 11, 2019, now Pat. No. 11,526,899.

(60) Provisional application No. 62/915,076, filed on Oct. 15, 2019.

(51) Int. Cl.
　　　G06Q 30/06　　　(2023.01)
　　　G06F 16/906　　　(2019.01)
　　　G06N 20/00　　　(2019.01)
　　　G06F 18/25　　　(2023.01)

(58) Field of Classification Search
　　　USPC ....................................................... 705/7.31
　　　See application file for complete search history.

(56) References Cited

U.S. PATENT DOCUMENTS

| | | | |
|---|---|---|---|
| 9,218,574 | B2 | 12/2015 | Phillipps et al. |
| 9,785,951 | B1 | 10/2017 | Coleman et al. |
| 10,002,329 | B2 | 6/2018 | Mehanna et al. |
| 10,102,476 | B2 | 10/2018 | Caraviello et al. |
| 10,192,243 | B1 | 1/2019 | Genc-Kaya et al. |
| 10,255,550 | B1 | 4/2019 | Simkoff et al. |
| 10,402,788 | B2 | 9/2019 | Morrow et al. |
| 11,526,899 | B2 | 12/2022 | Ouellet et al. |
| 11,537,825 | B2 | 12/2022 | Ouellet et al. |
| 2010/0088344 | A1 | 4/2010 | Treat et al. |
| 2010/0138273 | A1* | 6/2010 | Bateni ................. G06Q 30/0202 705/7.31 |
| 2012/0303411 | A1 | 11/2012 | Chen et al. |
| 2012/0303412 | A1* | 11/2012 | Etzioni ................. G06Q 30/06 705/7.31 |
| 2013/0166350 | A1* | 6/2013 | Willemain ......... G06Q 30/0202 705/7.31 |
| 2014/0122401 | A1 | 5/2014 | Collica |
| 2014/0156346 | A1 | 6/2014 | Cai |
| 2014/0358828 | A1 | 12/2014 | Phillipps et al. |
| 2015/0019204 | A1 | 1/2015 | Simard et al. |
| 2015/0379072 | A1 | 12/2015 | Dirac et al. |
| 2015/0379429 | A1 | 12/2015 | Lee et al. |
| 2016/0078022 | A1 | 3/2016 | Lisuk et al. |
| 2016/0092519 | A1* | 3/2016 | Srivastava ......... G06Q 30/0641 707/722 |
| 2016/0260052 | A1* | 9/2016 | Ray ..................... G06Q 10/087 |
| 2016/0358099 | A1 | 12/2016 | Sturlaugson et al. |
| 2017/0061329 | A1 | 3/2017 | Kobayashi et al. |
| 2017/0270484 | A1 | 9/2017 | Cengiz et al. |
| 2017/0308976 | A1 | 10/2017 | Eidelman et al. |
| 2017/0315523 | A1 | 11/2017 | Cross et al. |
| 2018/0047071 | A1* | 2/2018 | Hsu ..................... G06Q 30/0282 |
| 2018/0053116 | A1 | 2/2018 | Cai et al. |
| 2018/0240013 | A1 | 8/2018 | Strope et al. |
| 2018/0300576 | A1 | 10/2018 | Dalyac et al. |
| 2018/0308051 | A1* | 10/2018 | Nemati ........... G06Q 10/08345 |
| 2018/0373208 | A1 | 12/2018 | Wee et al. |
| 2018/0374109 | A1* | 12/2018 | Scarpati ................ G06N 5/003 |
| 2019/0018823 | A1 | 1/2019 | Yabe et al. |
| 2019/0102693 | A1 | 4/2019 | Yates et al. |
| 2019/0108417 | A1* | 4/2019 | Talagala ................ G06N 5/04 |
| 2019/0130425 | A1* | 5/2019 | Lei ..................... G06Q 10/0631 |
| 2019/0147350 | A1 | 5/2019 | Bai et al. |
| 2019/0156357 | A1* | 5/2019 | Palinginis ............ G06K 9/6218 |
| 2019/0156485 | A1 | 5/2019 | Pfeiffer |
| 2019/0228590 | A1 | 7/2019 | Kaifosh et al. |
| 2019/0272557 | A1* | 9/2019 | Smith ..................... G06F 17/18 |
| 2020/0005340 | A1* | 1/2020 | T. ........................ G06Q 10/087 |
| 2020/0042896 | A1 | 2/2020 | Ko et al. |
| 2020/0065424 | A1* | 2/2020 | Ananthapur Bache .. G06N 3/08 |
| 2020/0074402 | A1* | 3/2020 | Adato ................ G06K 9/00771 |
| 2020/0090009 | A1 | 3/2020 | Arora et al. |
| 2020/0097709 | A1 | 3/2020 | Huang et al. |
| 2020/0098055 | A1* | 3/2020 | O'Hara .................. G06N 20/00 |
| 2020/0111109 | A1 | 4/2020 | Lei |
| 2020/0130425 | A1 | 4/2020 | Sorrentino et al. |
| 2020/0134641 | A1 | 4/2020 | Morgan et al. |
| 2020/0134642 | A1* | 4/2020 | Morgan ............ G06Q 30/0202 |
| 2020/0184494 | A1* | 6/2020 | Joseph ................ G06K 9/6256 |
| 2020/0191594 | A1 | 6/2020 | Watanabe |
| 2020/0210920 | A1* | 7/2020 | Joseph ................... G06N 20/00 |
| 2020/0226504 | A1* | 7/2020 | Keng ...................... G06N 5/003 |
| 2020/0250556 | A1 | 8/2020 | Nourian et al. |
| 2021/0110429 | A1* | 4/2021 | Keng ................... G06K 9/6256 |

OTHER PUBLICATIONS

International Search Report from related PCT International Application No. PCT/CA2020/051379, dated Jan. 4, 2021.
International Search Report from related PCT International Application No. PCT/CA2020/051378, dated Dec. 16, 2020.
International Search Report from related PCT International Application No. PCT/CA2020/051347, dated Jan. 8, 2021.
Badam et al., "Time Fork: Interactive Prediction of Time Series, "CHI '16: Proceedings of the 2016 CHI Conference on Human Factors in Computing Systems May 2016, pp. 5409-5420.
Canadian Patent Application No. 3,154,982 Office Action dated Jun. 29, 2023.
Hu et al., "Identifying the "Ghost City" of Domain Topics in a Keyword Semantic Space Combining Citations," Scientometrics, 2018, vol. 114(3), 1141-1157.
International Patent Application No. PCT/CA2020/051379, International Preliminary Report on Patentability dated Jan. 5, 2022.
International Preliminary Report on Patentability from related PCT International Application No. PCT/CA2020/051378, dated Jan. 25, 2022, pp. 1-5.
Japanese Patent Application No. JP2022-521962, Office Action dated Oct. 21, 2022—English Translation available.
Runkler et al., "Generation of Linguistic Membership Functions from Word Vectors," IEEE International Conference on Fuzzy Systems, Jul. 2016, pp. 993-999.
U.S. Appl. No. 16/599,143, Notice of Allowance dated Aug. 10, 2022.
U.S. Appl. No. 16/697,620, Advisory Action dated Apr. 21, 2023.
U.S. Appl. No. 16/697,620, Final office action dated Feb. 9, 2023.
U.S. Appl. No. 16/697,620, Office Action dated Apr. 29, 2022.
U.S. Appl. No. 16/697,620, Office Action dated Jul. 13, 2022.
U.S. Appl. No. 16/699,010, Final Office Action dated Apr. 24, 2023.
U.S. Appl. No. 17/987,401, Notice of Allowance dated Jun. 1, 2023.
U.S. Appl. No. 16/599,143, Advisory Action dated Jun. 9, 2022.
U.S. Appl. No. 16/599,143, Final Office Action dated Feb. 3, 2022.
U.S. Appl. No. 16/599,143, Non-Final Office Action dated Aug. 18, 2021.
U.S. Appl. No. 16/699,010, Advisory Action dated Jul. 14, 2023.
U.S. Appl. No. 16/699,010, Office Action dated Nov. 9, 2022.
U.S. Appl. No. 16/837,182, Final Office Action dated Apr. 27, 2022.
U.S. Appl. No. 16/837,182, Non-Final Office Action dated Sep. 16, 2021.
Yoshizaki et al., "Machine Learning Usage Guide by Practical Learning ," Mynavi Publishing Corporation, Naoki Takiguchi, Sep. 20, 2019, vol. 1 (1), pp. 156-165.
European Patent Application No. 20876015, Extended European Search Report dated Sep. 1, 2023.
U.S. Appl. No. 16/697,620, Non-Final office Action dated Jul. 31, 2023.

* cited by examiner

EXPANDED HISTORICAL PROMOTIONS DATA — 1200

| Part ID | Date | Promo |
|---|---|---|
| A | 2019-01-01 | Sale |
| A | 2019-01-02 | Sale |
| ... | ... | ... |
| A | 2019-01-08 | Holiday |
| A | 2019-01-09 | Holiday |
| ... | ... | ... |
| B | 2019-01-02 | Weekend |
| B | 2019-01-03 | Weekend |
| ... | ... | ... |
| B | 2019-02-02 | Sale |
| B | 2019-02-03 | Sale |

1202

HISTORICAL PROMOTIONS DATA — 1008

| Part ID | StartDate | EndDate | Promo |
|---|---|---|---|
| A | 2019-01-01 | 2019-01-04 | Sale |
| A | 2019-01-08 | 2019-01-15 | Holiday |
| ... | ... | ... | ... |
| B | 2019-01-02 | 2019-01-05 | Weekend |
| B | 2019-02-02 | 2019-02-07 | Sale |

FUSED DEMAND AND PROMOTION DATA
1302

| Part ID | Customer ID | Date | Quantity | Location | Promo |
|---|---|---|---|---|---|
| A | 1 | 2019-01-02 | 1.3 | NYC | Sale |
| A | 1 | 2019-01-08 | 2.5 | NYC | Holiday |
| ... | ... | ... | ... | ... | ... |
| B | 2 | 2019-01-02 | 4 | London | Weekend |
| B | 2 | 2019-02-02 | 6 | London | Sale |

HISTORICAL WEATHER DATA
1104

| Location | Date | Temperature |
|---|---|---|
| NYC | 2019-01-02 | 72 |
| ... | ... | ... |
| London | 2019-02-02 | 85 |

FULLY FUSED DATA (DEMAND, PROMOTION AND AND WEATHER DATA)
1402

| Part ID | Customer ID | Date | Quantity | Location | Promo | Temperature |
|---|---|---|---|---|---|---|
| A | 1 | 2019-01-02 | 1.3 | NYC | Sale | 72 |
| A | 1 | 2019-01-08 | 2.5 | NYC | Holiday | 75 |
| ... | ... | ... | ... | ... | ... | ... |
| B | 2 | 2019-01-02 | 4 | London | Weekend | 85 |
| B | 2 | 2019-02-02 | 6 | London | Sale | 83 |

FIG. 14

1402 — FULLY FUSED DATA (DEMAND, PROMOTION AND AND WEATHER DATA) — 1500

| Part ID | Customer ID | Date | Quantity | Location | Promo | Temperature |
|---|---|---|---|---|---|---|
| A | 1 | 2019-01-02 | 1.3 | NYC | Sale | 72 |
| A | 1 | 2019-01-08 | 2.5 | NYC | Holiday | 75 |
| ... | ... | ... | ... | ... | ... | ... |
| B | 2 | 2019-01-02 | 4 | London | Weekend | 85 |
| B | 2 | 2019-02-02 | 6 | London | Sale | 83 |

1502 — FUSED META DATA

| Column Name ID | Column Type |
|---|---|
| Part ID | KeyType |
| Customer ID | KeyType |
| Date | DateType |
| Quantity | ForecastType |
| Location | KeyType |
| Promo | EventType |
| Temperature | NumericType |

1504 — TRANSFORMATION LIBRARY

| Transformation | Input Types |
|---|---|
| IsHoliday | DateType |
| WeekDay | DateType |
| Month | DateType |
| Week | DateType |
| Year | DateType |
| WeeklyAvg | DateType + NumericType |
| DaysSince | DateType + EventType |
| DaysUntil | DateType + EventType |

1602 TRANSFORMATION AND COLUMN COMBINATIONS

| Columns | Applicable Transformations |
|---|---|
| Date | IsHoliday, WeekDay, Month, Week, Year |
| Date + Temperature | WeeklyAvg |
| Date + Promo | DaysSince, DaysUntil |

1402 FULLY FUSED DATA (DEMAND, PROMOTION AND AND WEATHER DATA)

| Part ID | Customer ID | Date | Quantity | Location | Promo | Temperature |
|---|---|---|---|---|---|---|
| A | 1 | 2019-01-02 | 1.3 | NYC | Sale | 72 |
| A | 1 | 2019-01-08 | 2.5 | NYC | Holiday | 75 |
| ... | ... | ... | ... | ... | ... | ... |
| B | 2 | 2019-01-02 | 4 | London | Weekend | 85 |
| B | 2 | 2019-02-02 | 6 | London | Sale | 83 |

1604 FEATURE GENERATED DATA

| Part ID | Cust. ID | Date | Qty | Location | Promo | Temp | Is Holiday | Week Day | Month | W. | Year | W. Avg | Days Since | Days Until |
|---|---|---|---|---|---|---|---|---|---|---|---|---|---|---|
| A | 1 | 2019-01-02 | 1.3 | NYC | Sale | 72 | 1 | 2 | 1 | 1 | 2019 | 73 | 0 | 28 |
| A | 1 | 2019-01-08 | 2.5 | NYC | Holiday | 75 | 0 | 8 | 1 | 2 | 2019 | 74 | 7 | 21 |
| ... | ... | ... | ... | ... | ... | ... | ... | ... | ... | ... | ... | ... | ... | ... |
| B | 2 | 2019-01-02 | 4 | London | Weekend | 85 | 0 | 2 | 1 | 1 | 2019 | 81 | 0 | 48 |
| B | 2 | 2019-02-02 | 6 | London | Sale | 83 | 0 | 2 | 2 | 5 | 2019 | 82 | 30 | 9 |

FEATURE GENERATED DATA (1602)

| Part ID | Cust. ID | Date | Qty | Location | Promo | Temp | Is Holiday | Week Day | Month | W. | Year | W. Avg | Days Since | Days Until |
|---|---|---|---|---|---|---|---|---|---|---|---|---|---|---|
| A | 1 | 2019-01-02 | 1.3 | NYC | Sale | 72 | 1 | 2 | 1 | 1 | 2019 | 73 | 0 | 28 |
| A | 1 | 2019-01-08 | 2.5 | NYC | Holiday | 75 | 0 | 8 | 1 | 2 | 2019 | 74 | 7 | 21 |
| ... | ... | ... | ... | ... | ... | ... | ... | ... | ... | ... | ... | ... | ... | ... |
| B | 2 | 2019-01-02 | 4 | London | Weekend | 85 | 0 | 2 | 1 | 1 | 2019 | 83 | 0 | 40 |
| B | 2 | 2019-02-02 | 6 | London | Sale | 83 | 0 | 2 | 2 | 5 | 2019 | 82 | 30 | 9 |

FEATURE SELECTED DATA (1702)

| Part ID | Customer ID | Date | Quantity | Temperature | Month | Year |
|---|---|---|---|---|---|---|
| A | 1 | 2019-01-02 | 1.3 | 72 | 1 | 2019 |
| A | 1 | 2019-01-08 | 2.5 | 75 | 1 | 2019 |
| ... | ... | ... | ... | ... | ... | ... |
| B | 2 | 2019-01-02 | 4 | 85 | 1 | 2019 |
| B | 2 | 2019-02-02 | 6 | 83 | 2 | 2019 |

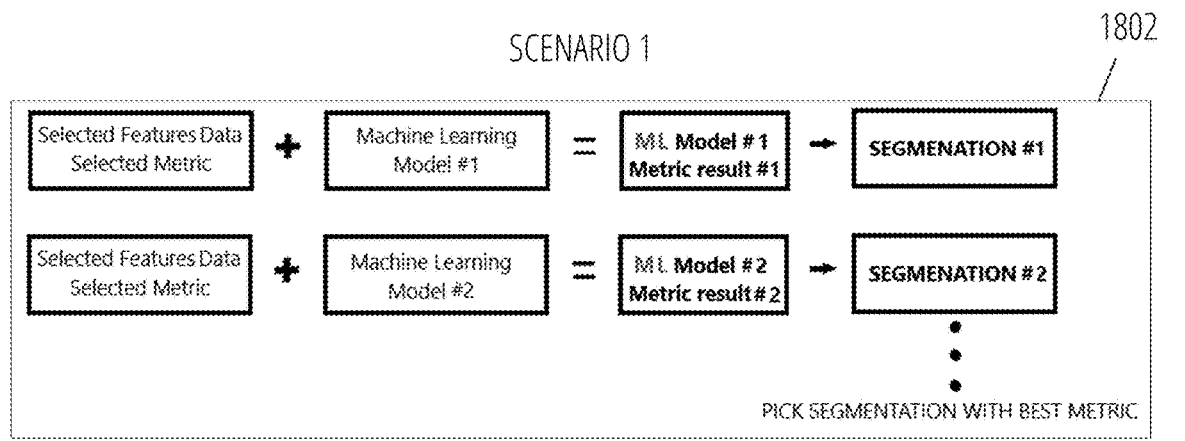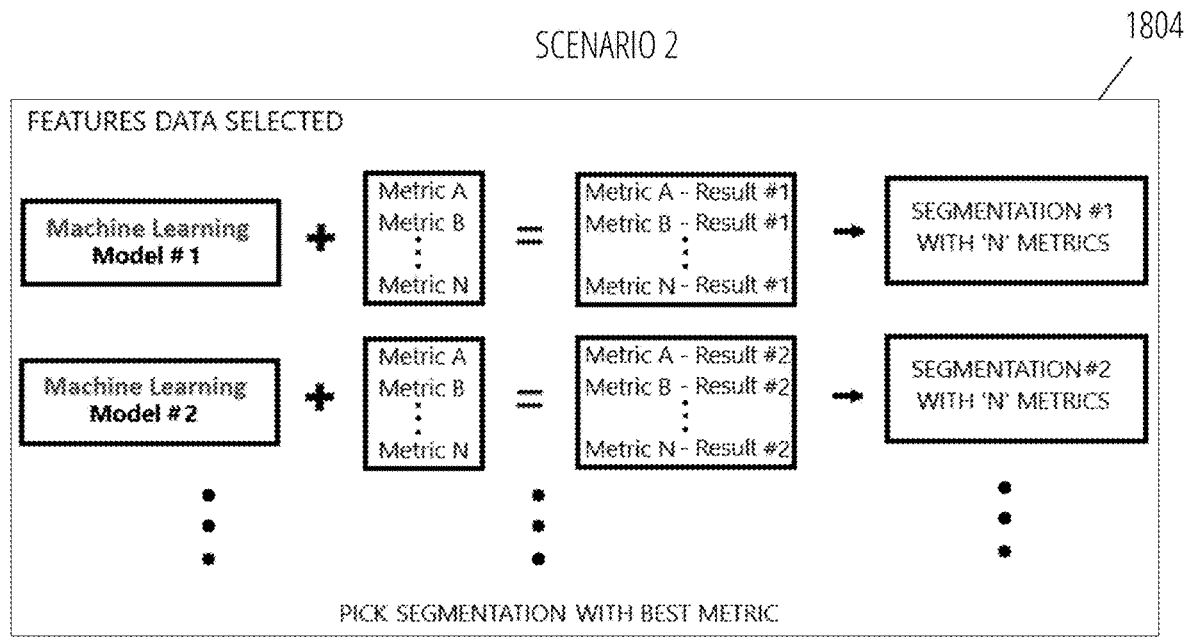
FIG. 18

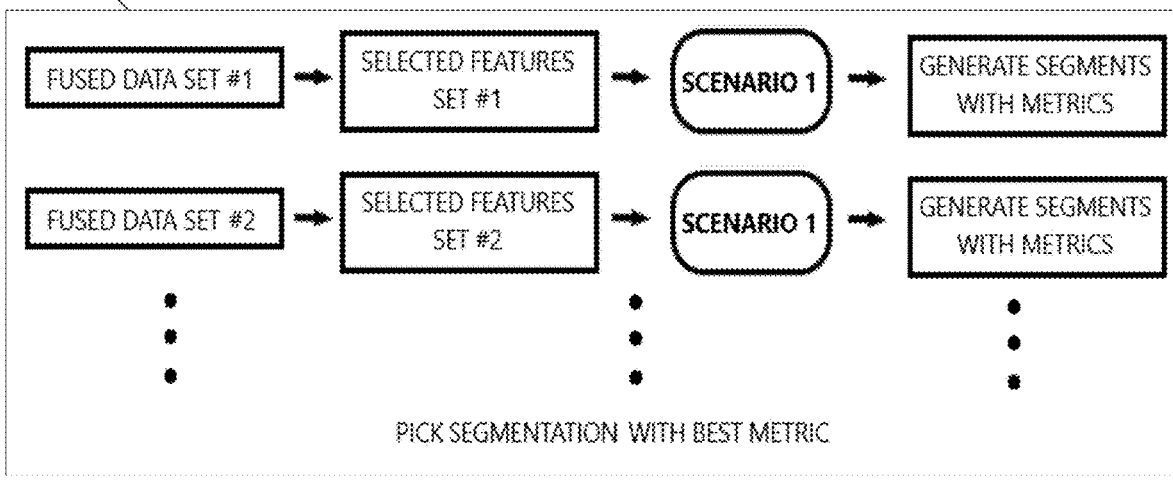
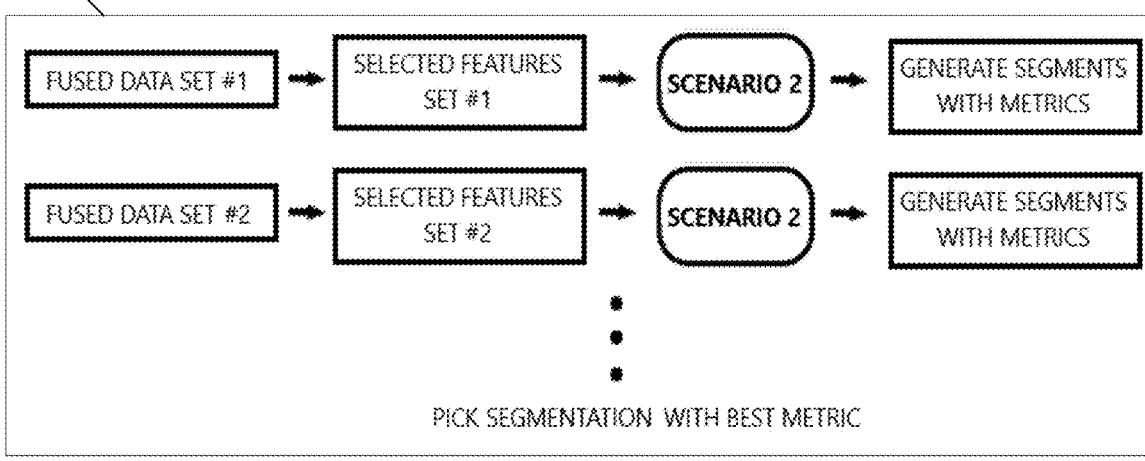
FIG. 19

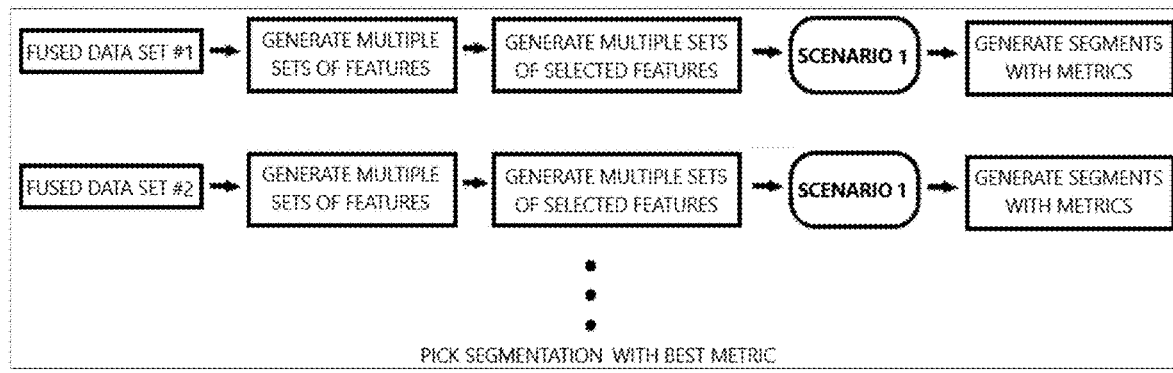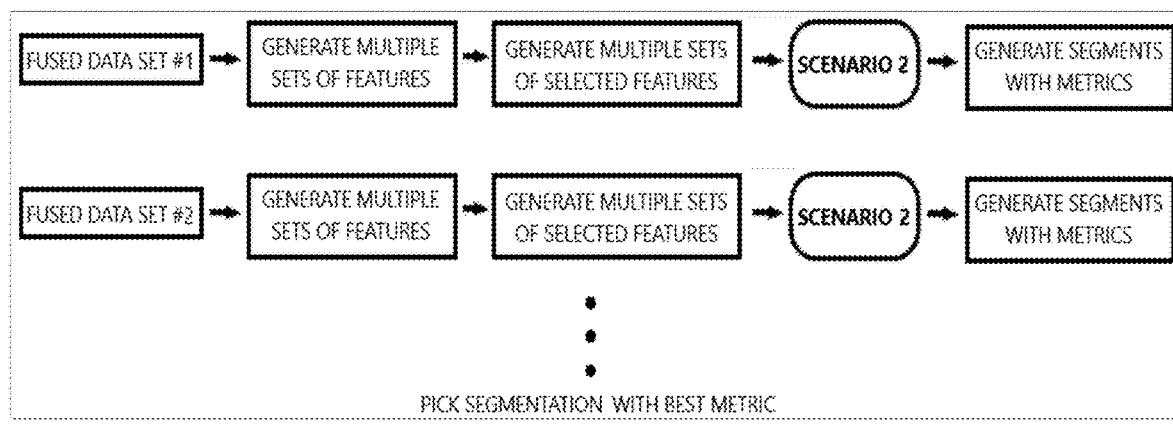
FIG. 20

FIG. 21

MACHINE LEARNING SEGMENTATION METHODS AND SYSTEMS

CROSS-REFERENCE TO RELATED APPLICATIONS

This application is a continuation-in-part of U.S. application Ser. No. 16/837,182, filed Apr. 1, 2020, which is a continuation-in-part of U.S. application Ser. No. 16/599,143, filed Oct. 11, 2019. This application claims the benefit of U.S. Provisional Patent Application No. 62/915,076, filed Oct. 15, 2019, and is also a continuation-in-part of U.S. application Ser. No. 16/697,620, filed Nov. 27, 2019, which claims the benefit of U.S. Provisional Application No. 62/915,076, filed Oct. 15, 2019, all of which are hereby incorporated by reference herein in their respective entirety.

TECHNICAL FIELD

The present disclosure relates to the field of machine learning and data visualization. In particular, it relates to the field of segmentation of data using features engineering.

BACKGROUND

In a supply chain, there can be so many individual items (such as parts, sites, customers, etc.) that need to be managed. Managing each and every one of these items is beyond the capability of any one person—and in fact, beyond the capacity of large teams of people. As such, one way to handle the sheer volume of items is to group items by their common attributes, or in other words, to segment items. Segmentation refers to grouping similar items together. It is important because it helps manage items that are similar, in similar ways. Segmentation reduces complexity by turning millions of items into manageable dozens of groups. Each group can be managed as a unit since of the items within the group are similar.

Unfortunately, items can have dozens of unique attributes—any combination of which might be the best for creating meaningful groups. For example, there are so many different potential attributes that can be used segment into identifiable groups. How does a user choose which attribute(s) to use? Once attributes are chosen, how are items divided? There can be hundred, thousands and even millions of attributes. How different is different enough? The process of segmentation requires quite a bit of consolidated data, judgement by planners and a lot of time. Furthermore, specialized experts are required—which adds to the mounting costs of segmentation. Therefore, these grouping (or segmentation) efforts often require a great deal of time (for example, months to years), along with a great number of people and resources. These segmentation efforts are thus very time-consuming and expensive.

There is a need to perform segmentation in a timely, efficient and cost-efficient manner.

BRIEF SUMMARY

In one aspect, there is provided machine learning segmentation methods and systems (hereinto referred as an automated machine learning segmentation tool) that perform segmentation quickly, efficiently, cheaply, and optionally provides an interactive feature that allows a user to alter the segmentation until a desired result is obtained. The automated machine learning segmentation tool receives all potentially important attributes and provides segmentation. It also receives information about important features of the data and finds how best to differentiate between groups. This tool requires less time and human resources than conventional approaches to segmentation. In addition, visualization of the segmentation explains to a user how the segmentation was obtained.

The automated machine learning segmentation tool performs segmentation far more efficiently than conventional approaches. For example, one million items can be segmented in a matter of minutes. The automated machine learning segmentation tool also provides increased accuracy; in some embodiments, the automated machine learning segmentation tool increases demand forecast accuracy by 66% for one-third of the parts.

In one aspect, a computer-implemented method for segmenting a plurality of items into a plurality of segments, each segment consisting a subset of the plurality of items, the method comprising the steps of: receiving, by a segmentation engine, data associated with each item of the plurality of items, each item associated with one or more attributes; engineering, by the segmentation engine, features associated with one or more signals to produce a set of selected features, the one or more signals comprising either: i) one or more internal signals associated with the data; or ii) one or more internal signals associated with the data and one or more external signals; training, by the segmentation engine, a plurality of cluster-based machine learning models on the set of selected features; selecting, by the segmentation engine, a segmentation of the plurality of items based on a metric.

In some embodiments, the computer-implemented method further comprises: visualizing, by a visual user interface, the segmentation of the plurality of items; and amending, by a user via the visual interface, the segmentation of the plurality of items to generate a new segmentation; wherein amending comprises either: amending at least one of the plurality of items and attributes prior to engineering, training and selecting; or retraining the plurality of cluster-based machine learning models.

In some embodiments of the computer-implemented method, the engineering features comprises: fusing, by the segmentation engine, data associated with the one or more signals, the fusing based on meta-data of each of the one or more signals; generating, by the segmentation engine, a plurality of features based on one or more valid combinations that match a transformation input, the transformation forming part of a library of transformations; and selecting, by the segmentation engine, a set of features from the plurality of features.

In some embodiments, the computer-implemented method further comprises: fusing, by the segmentation engine, data associated with the one or more signals to produce a plurality of fused data sets; generating, by the segmentation engine, a plurality of features for each fused data set; selecting, by the segmentation engine, a set of features for each fused data set, thereby generating a plurality of sets of selected features; and training, by the segmentation engine, the plurality of cluster-based machine learning models on the plurality of sets of selected features.

In some embodiments, the computer-implemented method further comprises: fusing, by the segmentation engine, data associated with the one or more signals to produce a plurality of fused data sets; generating, by the segmentation engine, a plurality of features for each fused data set; selecting, by the segmentation engine, a plurality of sets of selected features for each fused data set; and training, by the segmentation engine, the plurality of cluster-based machine learning models on the plurality of sets of selected features associated with each fused data set.

In some embodiments of the computer-implemented method, the plurality of cluster-based machine learning models are selected from k-means, fuzzy c-means, Gaussian mixture model clustering; spectral clustering; hierarchical clustering, mean-shift, density-based spatial clustering of applications with noise (DBSCAN) and BFR algorithm; and the metric is selected from at least one of Davies-Bouldin (DB) index, Dunn index and Silhouette coefficient. Furthermore, in some embodiments, the one or more external signals is selected from weather and financial data.

In another aspect, a system for segmenting a plurality of items into a plurality of segments, each segment consisting a subset of the plurality of items, the system comprising: a processor; and a memory storing instructions that, when executed by the processor, configure the system to the steps of: receive, by a segmentation engine, data associated with each item of the plurality of items, each item associated with one or more attributes; engineer, by the segmentation engine, features associated with one or more signals to produce a set of selected features, the one or more signals comprising either: i) one or more internal signals associated with the data; or ii) one or more internal signals associated with the data and one or more external signals; train, by the segmentation engine, a plurality of cluster-based machine learning models on the set of selected features; select, by the segmentation engine, a segmentation of the plurality of items based on a metric.

In some embodiments of the system, the instructions further configure the system to: visualize, by a visual user interface, the segmentation of the plurality of items; and amend, by a user via the visual interface, the segmentation of the plurality of items to generate a new segmentation; wherein amending comprises either: amend at least one of the plurality of items and attributes prior to engineering, training and selecting; or retrain the plurality of cluster-based machine learning models.

In some embodiments of the system, the instructions further configure the system to: fuse, by the segmentation engine, data associated with the one or more signals, fusing based on meta-data of each of the one or more signals; generate, by the segmentation engine, a plurality of features based on one or more valid combinations that match a transformation input, the transformation forming part of a library of transformations; and select, by the segmentation engine, a set of features from the plurality of features.

In some embodiments of the system, the instructions further configure the system to: fuse, by the segmentation engine, data associated with the one or more signals to produce a plurality of fused data sets; generate, by the segmentation engine, a plurality of features for each fused data set; select, by the segmentation engine, a set of features for each fused data set, thereby generating a plurality of sets of selected features; and train, by the segmentation engine, the plurality of cluster-based machine learning models on the plurality of sets of selected features.

In some embodiments of the system, the instructions further configure the system to: fuse, by the segmentation engine, data associated with the one or more signals to produce a plurality of fused data sets; generate, by the segmentation engine, a plurality of features for each fused data set; select, by the segmentation engine, a plurality of sets of selected features for each fused data set; and train, by the segmentation engine, the plurality of cluster-based machine learning models on the plurality of sets of selected features associated with each fused data set.

In some embodiments of the system, the plurality of cluster-based machine learn models are selected from k-means, fuzzy c-means, Gaussian mixture model clustering; spectral clustering; hierarchical clustering, mean-shift, density-based spatial clustering of applications with noise (DBSCAN) and BFR algorithm; and the metric is selected from at least one of Davies-Bouldin (DB) index, Dunn index and Silhouette coefficient. Furthermore, in some embodiments, the one or more external signals is selected from weather and financial data.

In yet another aspect, a non-transitory computer-readable storage medium for segmenting a plurality of items into a plurality of segments, each segment consisting a subset of the plurality of items, the computer-readable storage medium including instructions that when executed by a computer, cause the computer to the steps of: receive, by a segmentation engine, data associated with each item of the plurality of items, each item associated with one or more attributes; engineer, by the segmentation engine, features associated with one or more signals to produce a set of selected features, the one or more signals comprising either: i) one or more internal signals associated with the data; or ii) one or more internal signals associated with the data and one or more external signals; train, by the segmentation engine, a plurality of cluster-based machine learning models on the set of selected features; select, by the segmentation engine, a segmentation of the plurality of items based on a metric.

In some embodiments of the non-transitory computer-readable storage medium, the instructions further configure the computer to: visualize, by a visual user interface, the segmentation of the plurality of items; and amend, by a user via the visual interface, the segmentation to generate a new segmentation; wherein amending comprises either: amend at least one of the plurality of items and attributes prior to engineering, training and selecting; or retrain the plurality of cluster-based machine learning models.

In some embodiments of the non-transitory computer-readable storage medium, the instructions further configure the computer to: fuse, by the segmentation engine, data associated with the one or more signals, fusing based on meta-data of each of the one or more signals; generate, by the segmentation engine, a plurality of features based on one or more valid combinations that match a transformation input, the transformation forming part of a library of transformations; and select, by the segmentation engine, a set of features from the plurality of features.

In some embodiments of the non-transitory computer-readable storage medium, the instructions further configure the computer to: fuse, by the segmentation engine, data associated with the one or more signals to produce a plurality of fused data sets; generate, by the segmentation engine, a plurality of features for each fused data set; select, by the segmentation engine, a set of features for each fused data set, thereby generating a plurality of sets of selected features; and train, by the segmentation engine, the plurality of cluster-based machine learning models on the plurality of sets of selected features.

In some embodiments of the non-transitory computer-readable storage medium, the instructions further configure the computer to: fuse, by the segmentation engine, data associated with the one or more signals to produce a plurality of fused data sets; generate, by the segmentation engine, a plurality of features for each fused data set; select, by the segmentation engine, a plurality of sets of selected features for each fused data set; and train, by the segmentation engine, the plurality of cluster-based machine learning models on the plurality of sets of selected features associated with each fused data set.

In some embodiments of the non-transitory computer-readable storage medium, the plurality of cluster-based machine learn models are selected from k-means, fuzzy c-means, Gaussian mixture model clustering; spectral clustering; hierarchical clustering, mean-shift, density-based spatial clustering of applications with noise (DBSCAN) and BFR algorithm; and the metric is selected from at least one of Davies-Bouldin (DB) index, Dunn index and Silhouette coefficient.

In some embodiments of application to supply chain management, automated machine learning segmentation tool provides focused strategies, manages demand variability, improves forecast accuracy and maximizes customer service. The automated machine learning segmentation tool can segment millions of items in minutes, with the ability to navigate through dozens of categories and sub-categories such as: shelf-life, production volume, seasonality, demand, lead-time, life cycle, part, customer, source, store, part store, part source, etc.

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 12 illustrates a data table expansion in features engineering in accordance with one embodiment of an automated machine learning segmentation tool.

FIG. 14 illustrates a fusion of data tables in features engineering in accordance with one embodiment of an automated machine learning segmentation tool.

FIG. 15 illustrates a step in feature generation in accordance with one embodiment of an automated machine learning segmentation tool.

FIG. 16 illustrates feature generation in accordance with one embodiment of an automated machine learning segmentation tool.

FIG. 17 illustrates feature selection in features engineering in accordance with one embodiment of an automated machine learning segmentation tool.

FIG. 18 illustrates two scenarios for model selection in accordance with one embodiment of an automated machine learning segmentation tool.

FIG. 19 illustrates two scenarios for model selection in accordance with one embodiment of an automated machine learning segmentation tool.

FIG. 20 illustrates two scenarios for model selection in accordance with one embodiment of an automated machine learning segmentation tool.

FIG. 21 illustrates a configuration in accordance with one embodiment of an automated machine learning segmentation tool.

DETAILED DESCRIPTION

Figure 1:
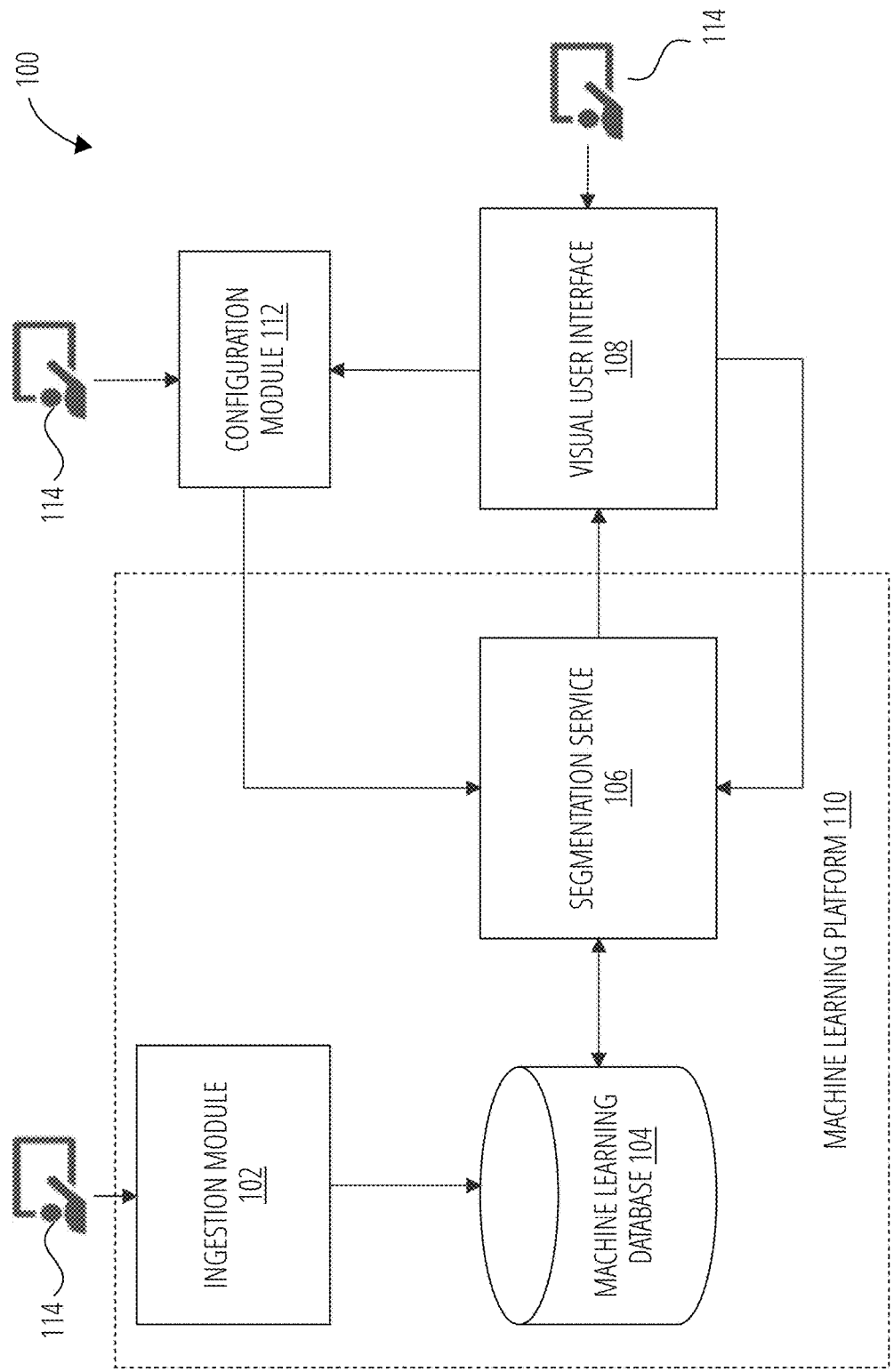
FIG. 1 illustrates an overview 100 in accordance with one embodiment of an automated machine learning segmentation tool.

In the present document, any embodiment or implementation of the present subject matter described herein as serving as an example, instance or illustration, and is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or system proceeded by "comprises . . . a" does not, without more constraints, preclude the existence of other elements or additional elements in the system or apparatus.

The term "segmentation service" comprises configuration of data and all the steps to prepare the data and train machine learning models. The term "segmentation engine" comprises all the steps to prepare the data (i.e. features engineering) and to train machine learning models (i.e. segmentation service minus the configuration). Finally, the term "segmentation method" refers to the process of testing various machine learning models and sets of selected features and selecting the best segments based on metrics (i.e. segmentation engine minus features engineering).

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an overview 100 in accordance with one embodiment of the automated machine learning tool.

FIG. 1 illustrates how, in an embodiment, various elements may be combined to perform segmentation rapidly, efficiently and cheaply. Initially, the user loads data using an ingestion module 102. Then she configures the segmentation process by selecting items and their attributes via a configuration module 112. The segmentation process reads the data from a machine learning database 104, given the configuration, and groups the items. The segmentation is shown on visual user interface 108. The user interacts with the interface to analyze the results and provides feedback, if any. Iteratively, the user runs the process based on her feedback until results become satisfactory.

An ingestion module 102 is used to load data (provided by a user 114) into a machine learning database 104. A configuration module 112 helps user 114 to specify items of interest and the attributes which should be leveraged in the segmentation process. Configuration module 112 provides inputs for the segmentation service 106. In some embodiments, configuration module 112 is a web application that is equipped with interactive job configuration.

Machine learning platform 110 comprises ingestion module 102, machine learning database 104 and an interactive machine learning segmentation service 106. The interactive machine learning segmentation service 106 places items into similar segments (or groups), given the list of attributes. The interactivity of the service helps user 114 provide feedback in order to guide the segmentation process.

After the segmentation service 106 creates segments, the output is shown to user 114 using visualization techniques. The visualizations are interactive, via the visual user interface 108 and enable user 114 to provide feedback about the segmentations. user 114 can either amend the configuration of the visualized segments, via configuration module 112; or user 114 can amend the visualized segmentation through the visual user interface 108, after which segmentation service 106 creates new segments. This process is run iteratively, based on the feedback by user 114 at each iteration, until the segmentation results are deemed satisfactory by user 114.

This system can perform segmentation on any set of items and attributes efficiently, in a timely fashion. In addition, the system allows a user to provide feedback, while running the process iteratively until a desired result is obtained. The functionalities of this system enable users to easily perform any segmentation on data.

This system can perform segmentation on any set of items and attributes automatically and in a timely fashion. In addition, the system allows users to provide feedback and runs the process iteratively until a desired result is obtained. The functionalities of this system enable users to easily perform any segmentation of data.

Figure 2:
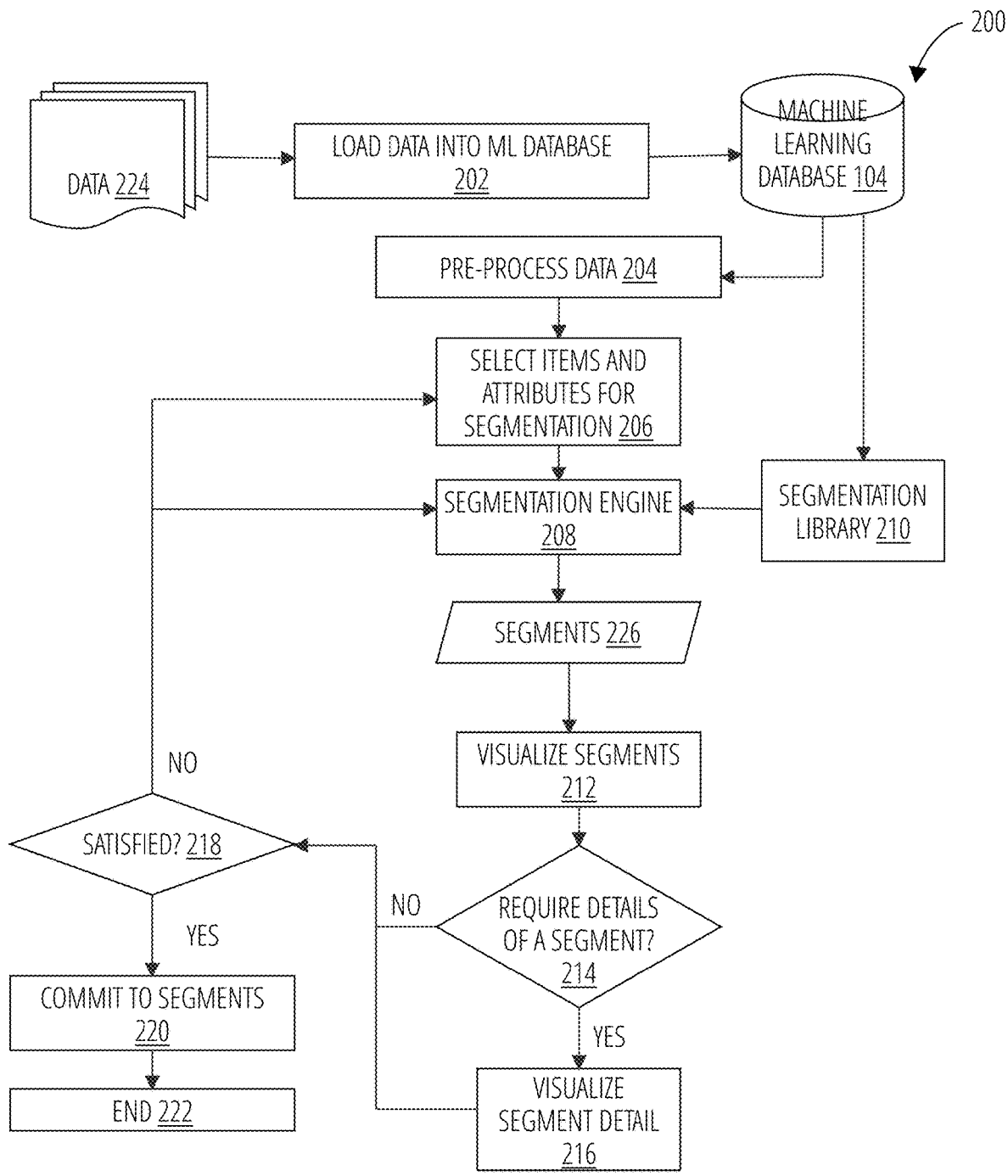
FIG. 2 illustrates a flowchart 200 in accordance with one embodiment of an automated machine learning segmentation tool.

FIG. 2 illustrates a flowchart 200 in accordance with one embodiment of an automated machine learning segmentation tool.

Raw data 224 is first transmitted to a machine learning database 104 at step 202. The data is pre-processed at step 204, after which a user selects items and attributes for segmentation at step 206. Segments 226 are created via a segmentation engine at step 208, using a segmentation library 210 (which can be stored in the machine learning database 104). Segmentation library 210 is a library of cluster-based machine learning models. Non-limiting examples of different types of machine learning models that can form part of segmentation library 210 include: k-means, fuzzy c-means, Gaussian mixture model clustering; spectral clustering; hierarchical clustering; mean-shift, density-based spatial clustering of applications with noise (DBSCAN) and BFR algorithm.

Once segments 226 are created, they are visualized at step 212. At this point, a user is given the option of visualizing the segments in greater detail at decision block 214. Such enhanced visualization is provided at step 216. Whether a detailed visualization is accessed, the user is then given the option of accepting the segmentation or not, at decision block 218. If the segmentation is acceptable, then the segments 226 are saved at step 220 and the routine ends at step 222.

If the segmentation is not deemed satisfactory by the user, then there are two options for feedback. Either the user decides that a new set of items and/or attributes should be selected, at which point items and attributes are selected at step 206, and the sequence of steps is once again re-executed until the user is satisfied with a revised set of segments, which are then saved at step 220 and the routine ends at step 222. An example of this type of feedback is when a user decides to change the attributes or items. For instance, after visually inspecting segments, a user decides that shipping method should be included in the list of attributes (which was not previously selected by the user). The user is then re-routed to configuration module 112 to include shipping, and the segmentation engine is run once more, but now with this additional attribute.

On the other hand, the user may decide to make changes to the observed first round of segments through an interactive feature, at which point, segments are re-created at step 208 (based on the interaction of the user), and the remainder of routine is once again re-executed until the user is satisfied with a revised set of segments, which are then saved at step 220 and the routine ends at step 222. An example of this type of feedback is when a user sees that two segments should be merged, and another segment should be split into three segments. This feedback is then provided to the segmentation engine, which re-calculates the segments based on this feedback.

With respect to the pre-process of step 204, pre-processing of data may include transformation, validation, remediation, or any combination thereof, of the data.

Validation of the data simply means to determine whether there are potential errors in the incoming data. For example, validation can include identification of missing data, null data, differences in row counts and data mismatches. In some embodiments, data validation module may use a machine learning algorithm in conjunction with a z-score threshold value to identify anomalous data values.

Data remediation involves remediation or re-calculation of data that is indicative of an error. For example: missing or erroneous values may be replaced using data that is interpolated from an existing value or values, an average of existing data or a mean of existing data. In some embodiments, remediation of data can use a predictive model to replace data that is indicative of error.

Other steps and features of FIG. 1 are discussed below.

Figure 3:
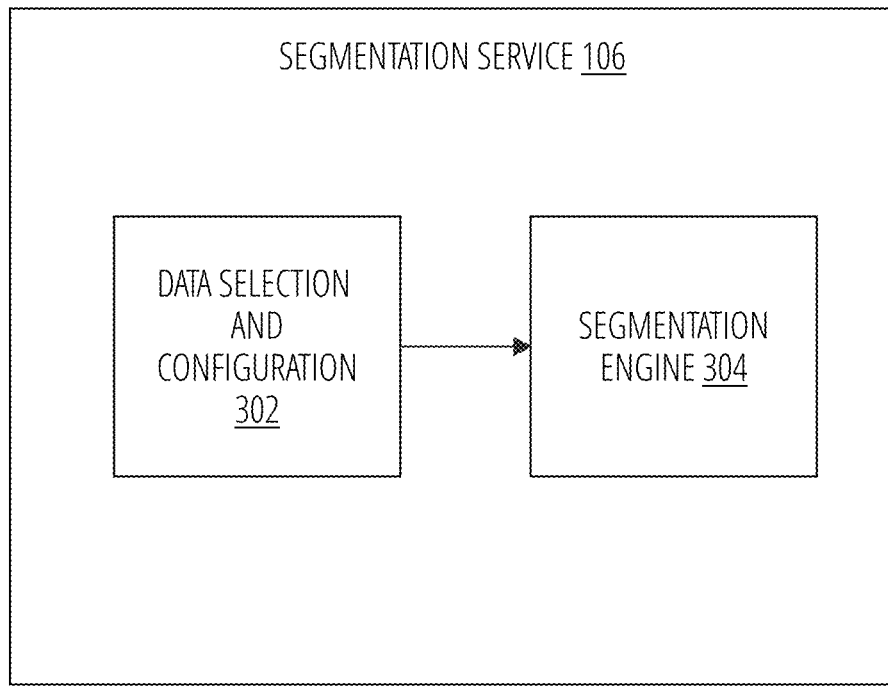
FIG. 3 illustrates a segmentation service in accordance with one embodiment of an automated machine learning segmentation tool.

FIG. 3 illustrates segmentation service 106 in accordance with one embodiment of an automated machine learning segmentation tool. Segmentation service 106 can comprise a module for data selection and configuration 302, that is fed into a segmentation engine 304. Data selection can comprise selection of items and attributes that will be subject to segmentation by the segmentation engine 304.

It should be noted that segmentation service 106 comprises configuration of data and all the steps to prepare the data and train machine learning models. The term "segmentation engine" comprises all the steps to prepare the data (i.e. features engineering) and to train machine learning models (i.e. segmentation service minus the configuration). Finally, the term "segmentation method" refers to the process of testing various machine learning models and sets of selected features and selecting the best segments based on metrics (i.e. segmentation engine minus features engineering).

Figure 4:
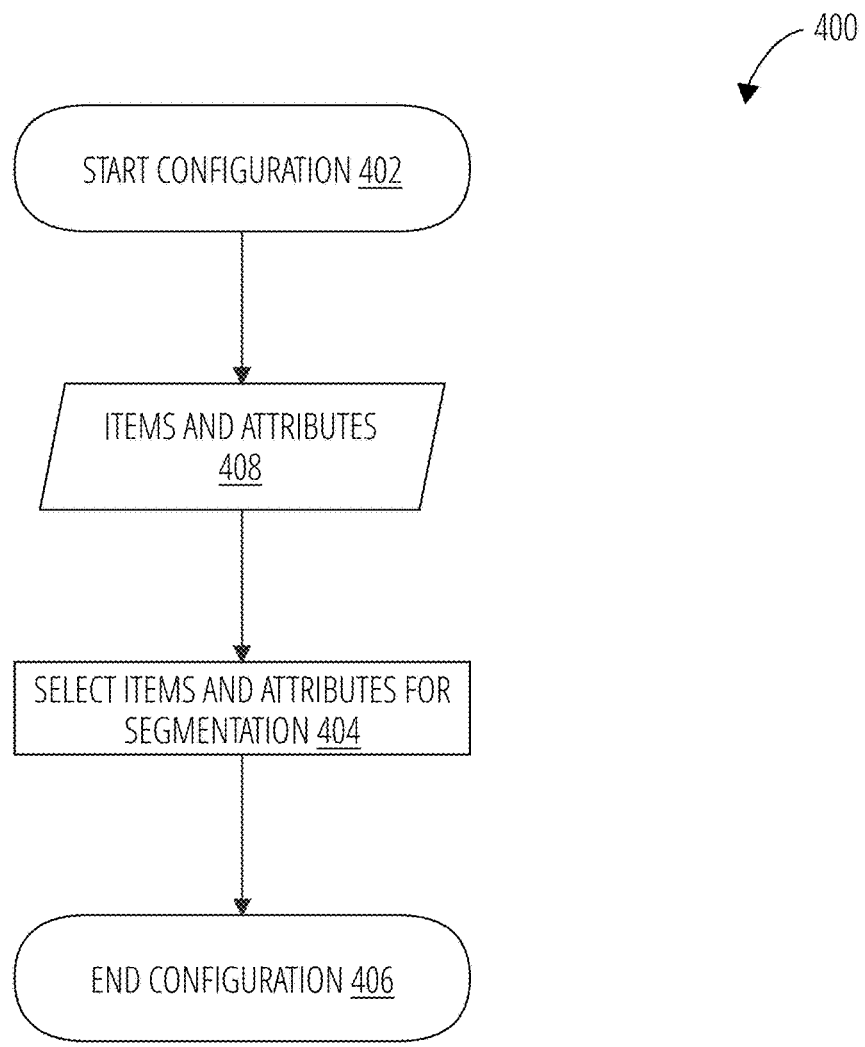
FIG. 4 illustrates a flowchart for configuration in accordance with one embodiment of an automated machine learning segmentation tool.

FIG. 4 illustrates a flowchart 400 for configuration in accordance with one embodiment of an automated machine learning segmentation tool. Configuration may comprise a series of simple steps in which items and attributes are selected for segmentation. Item 408 indicates the data that is to be segmented; this data comprises items and attributes. A user selects which items and attributes are to be used for the segmentation at step 404.

In some embodiments, items and attributes pertaining to supply chain management are used. These include Source, Store, Part Store, Part Source, Part, Life Cycle, Lead-time, Customer, Transportation, Shelf-life, Production volume, Seasonality, Demand, etc.

Figure 5:
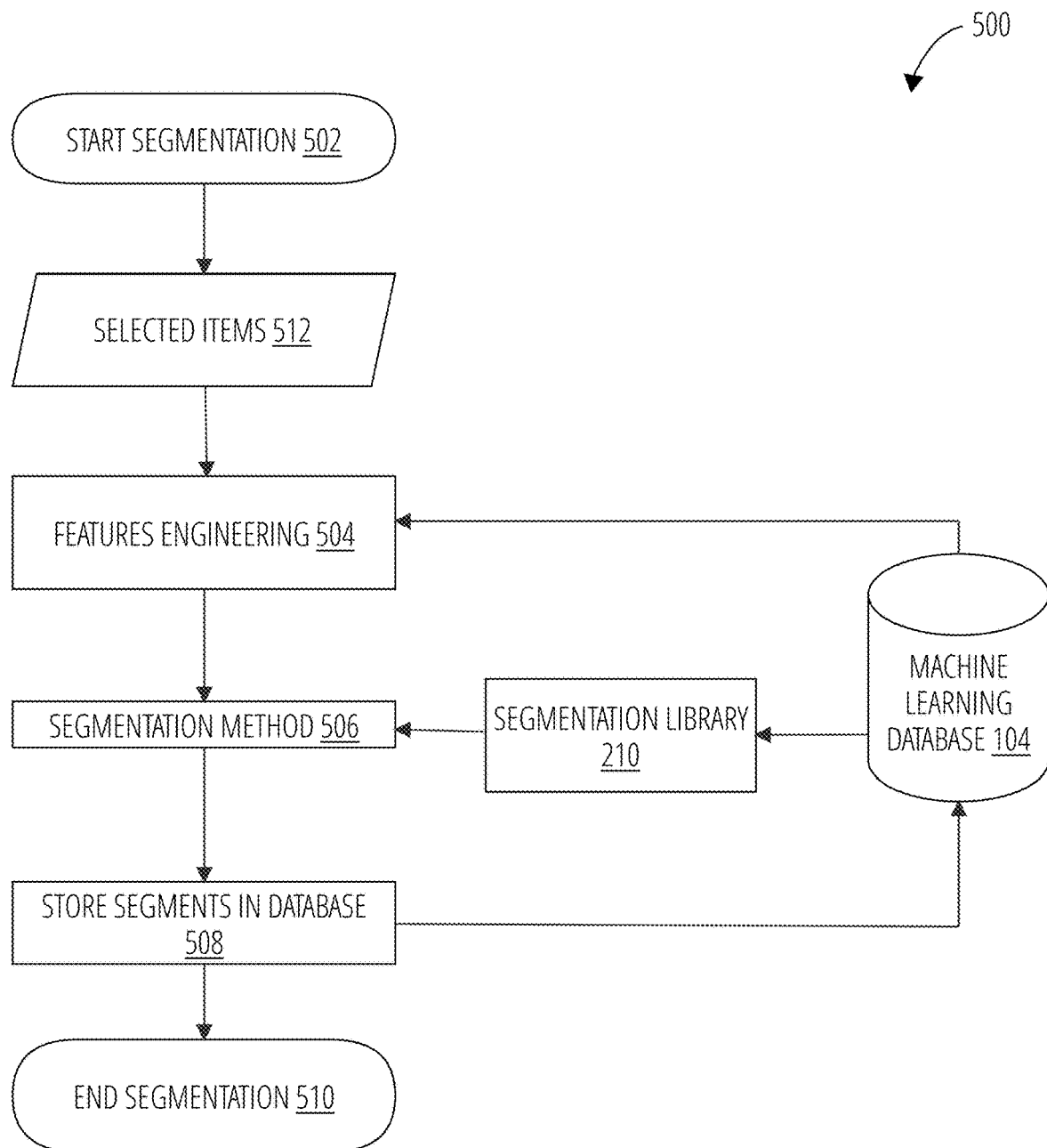
FIG. 5 illustrates a flowchart for segmentation in accordance with one embodiment of an automated machine learning segmentation tool.

FIG. 5 illustrates a flowchart 500 for segmentation in accordance with one embodiment of an automated machine learning segmentation tool. The items that have been selected (512) are subject to features engineering at step 504, which provides one or more sets of selected features which are used, in conjunction with the segmentation library 210, to find the best set of segments through different machine learning models using segmentation method 506. These segments are then stored in the machine learning database 104 at step 508. Features engineering is described in further detail below.

Segmentation library 210 is a library of cluster-based machine learning models. Non-limiting examples of different types of machine learning models that can form part of segmentation library 210 include: k-means, fuzzy c-means, Gaussian mixture model clustering; spectral clustering; hierarchical clustering; mean-shift, density-based spatial clustering of applications with noise (DBSCAN) and BFR algorithm.

A variety of metrics are used to find the best set of segments. Non-limiting examples of metrics used for cluster analysis include Davies-Bouldin (DB) index, Dunn index and Silhouette coefficient. Once a metric is chosen, the "best" set of segments corresponds to those that provide the best metric.

Figure 6:
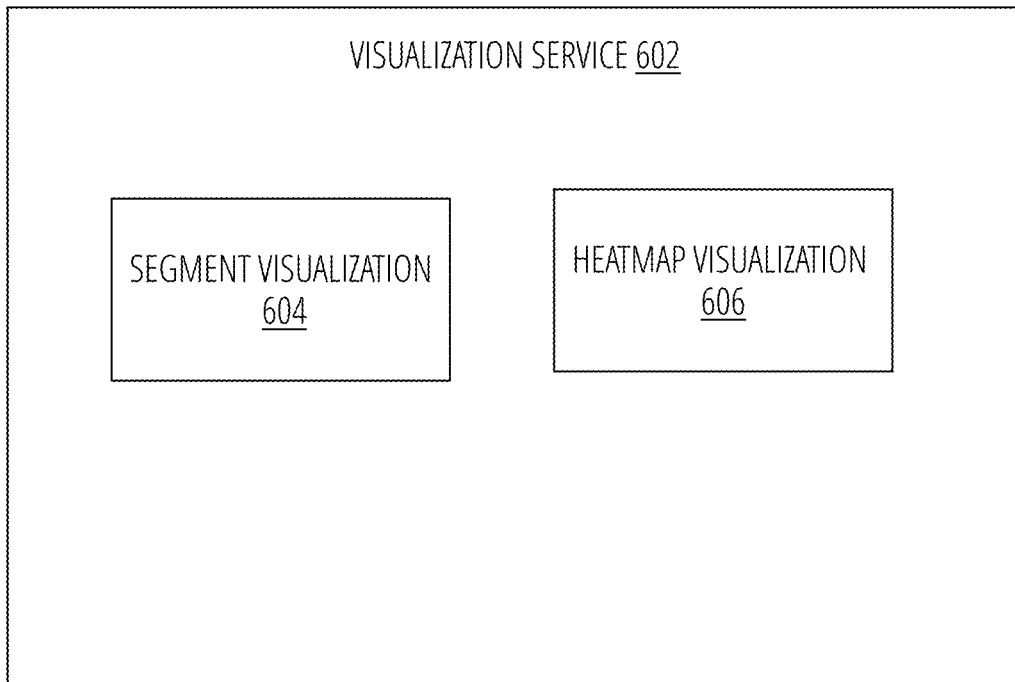
FIG. 6 illustrates a visualization service in accordance with one embodiment of an automated machine learning segmentation tool.

FIG. 6 illustrates a visualization service 602 in accordance with one embodiment of an automated machine learning segmentation tool. The visualization service 602 provides for segment visualization 604 and a more detailed heatmap visualization 606 of the segmentation.

Figure 7:
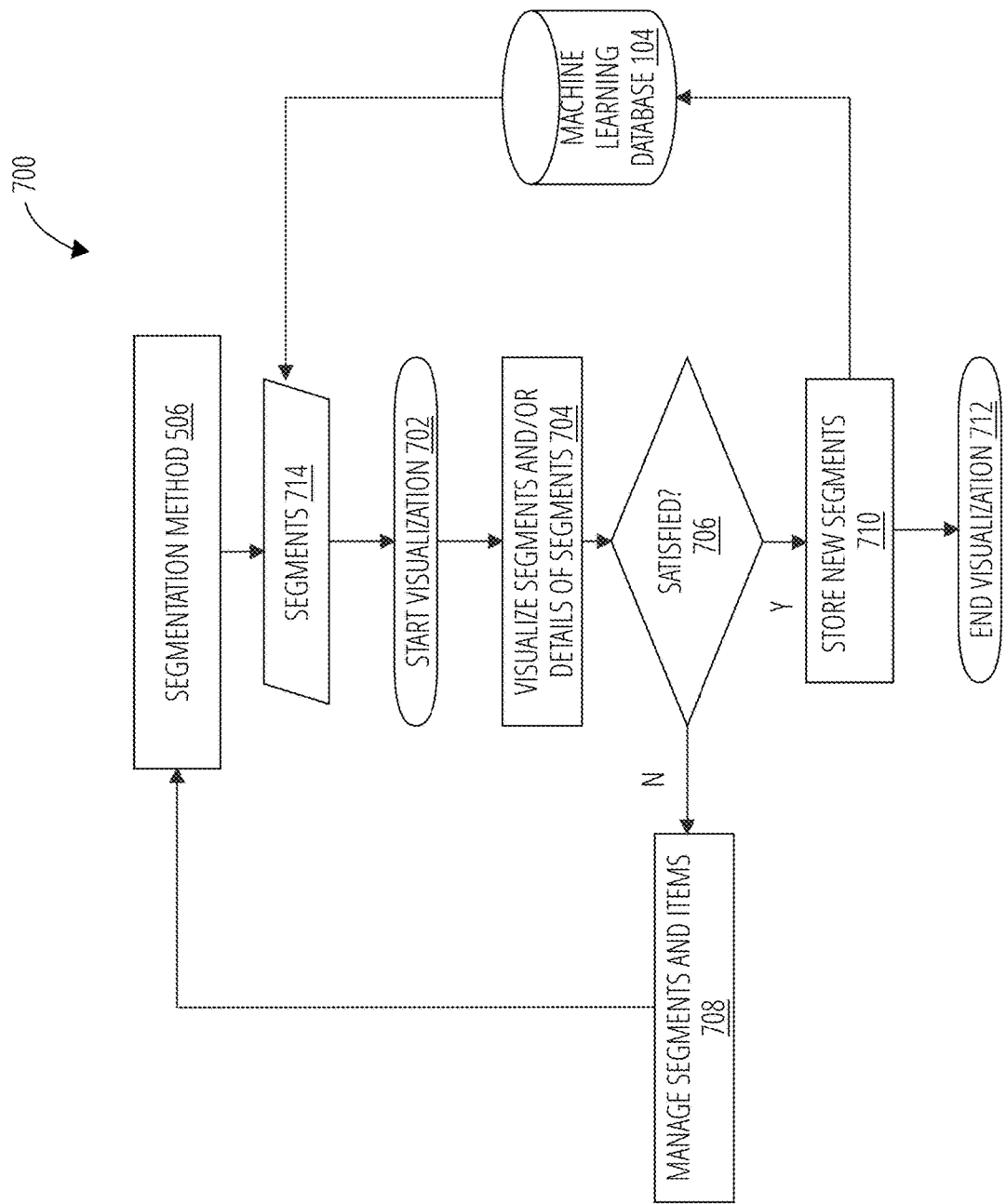
FIG. 7 illustrates a flowchart 700 for visualization in accordance with one embodiment of an automated machine learning segmentation tool.

FIG. 7 illustrates a flowchart 700 for visualization in accordance with one embodiment of an automated machine learning segmentation tool.

After segments are retrieved from machine learning database 104 at step 714, they are ready for visualization at step 702. The segments can be visualized at a high-level, or further details can be provided, at step 704. If the results are satisfactory, the segments are stored in machine learning database 104 at step 710, and the visualization ends at step 712.

If the segments are not satisfactory to the user, then the user can manage the segments and items. This can be done, for example, by any combination of splitting or merging segments; creating or deleting segments; add or removing pairwise item constraints; or assigning or removing an item to/from a segment. An example of pairwise item constraints includes keeping items 'A' and 'B' together in the same segment, or maintaining items 'A' and 'B' in different segments. This feedback is then provided to segmentation method 506 (see FIG. 5) where the process of finding the best segments is repeated.

An example of this type of feedback is when a user sees that two segments should be merged, and another segment should be split into three segments. This feedback is then provided to the segmentation method, which re-calculates the segments based on this feedback.

A user interacts with the visualized result through a user interface (see visual user interface 108 in FIG. 1). Visual user interface 108 is used by user 114 to amend the data. Visual user interface 108 can be any type of interface that provides a user to obtain the predicted results, amend, and transmit back to the segmentation method. In some embodiments, visual user interface 108 is a Graphical User Interface (GUI), in which the results are parsed by the GUI, thereby allowing user 114 to correct/constrain/fix the results, which are then transmitted back to the segmentation method, prior to transmission of a new segmentation.

Figure 8:
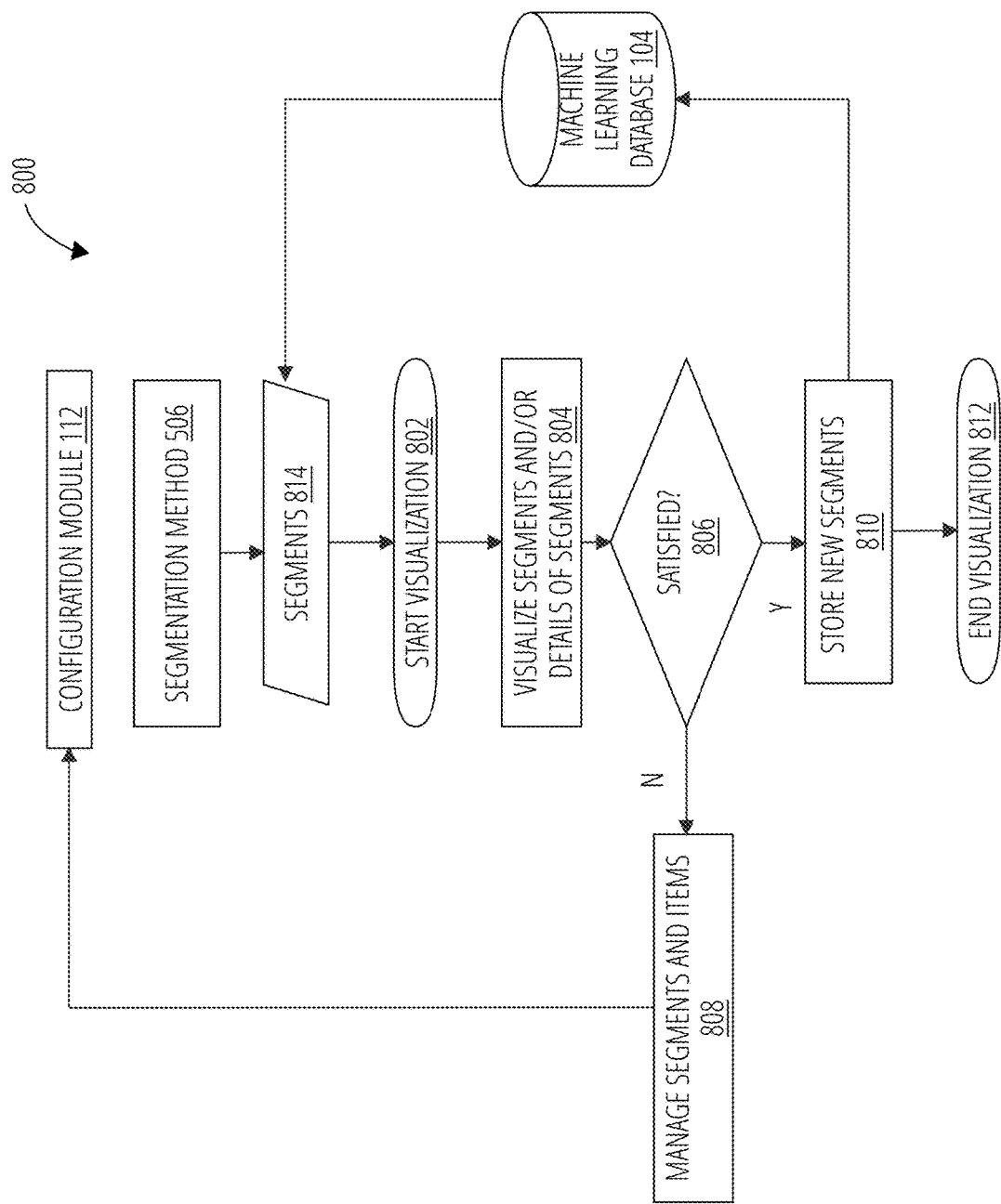
FIG. 8 illustrates a flowchart 800 for visualization in accordance with one embodiment of an automated machine learning segmentation tool.

FIG. 8 illustrates a flowchart 800 for visualization in accordance with one embodiment of an automated machine learning segmentation tool.

After segments are retrieved from machine learning database 104 at step 814, they are ready for visualization at step 802. The segments can be visualized at a high-level, or further details can be provided, at step 804. As in FIG. 7, If the results are satisfactory, the segments are stored in machine learning database 104 at step 810, and the visualization ends at step 812.

If the segments are not satisfactory to the user, such that the user wants to re-select items and attributes for segmentation, then this feedback is provided to 11 1302 for selecting items/attributes for segmentation (see FIG. 2 and FIG. 4). An example of this type of feedback is when a user decides to change the attributes or items. For instance, after visually inspecting segments, a user decides that shipping method should be included in the list of attributes (which was not previously selected by the user). The user is then re-routed to configuration module 112 to include shipping, and the segmentation method 506 is run once more, but now with this additional attribute.

Features Engineering

Figure 9:
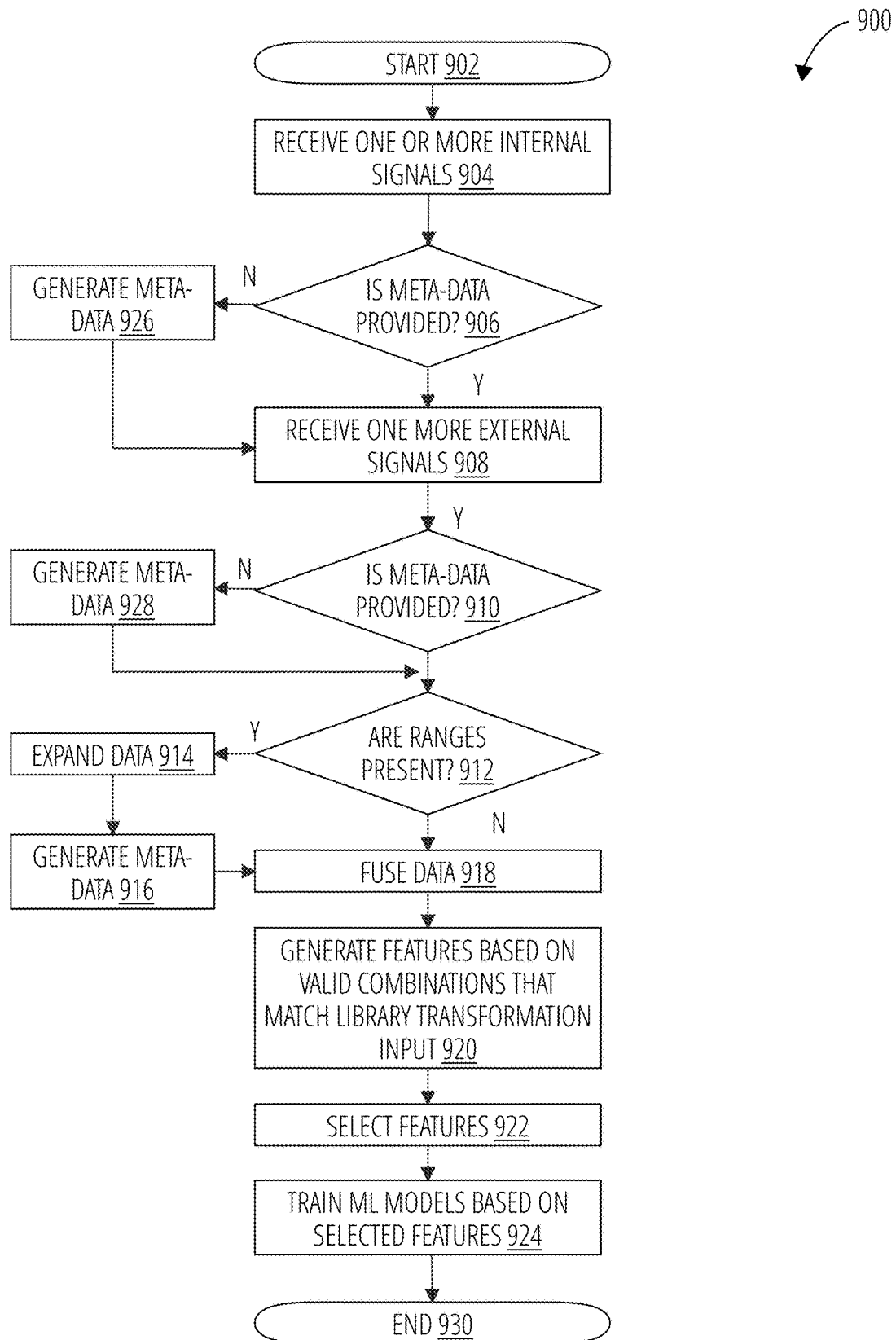
FIG. 9 illustrates a features engineering flowchart in accordance with one embodiment of an automated machine learning segmentation tool.

FIG. 9 illustrates a features engineering flowchart 900 in accordance with one embodiment of an automated machine learning segmentation tool.

At step 904, one or more internal signals are received from the set of selected items. If meta-data for each signal is not provided, then it can be generated at step 926. Similarly, one or more external signals (for example, weather, financial data sets, etc.) can be provided at step 908. If meta-data for each external signal is not provided, then it can be generated at step 928. Before fusing data, a check should be made whether or not ranges are present at decision block 912; if yes, the relevant data set is expanded at step 914, and meta-data of the expanded data set(s) is generated at step 916. After the data is fused at step 918, features are generated based on valid combinations that match the input of transformations from a library of transformations at step 920. In some embodiments, the transformation library (which includes all methods and functions) can be kept in an artifactory as a docker image. The generated features can be filtered by selecting features at step 922. Finally, the selected features are used to train and select a machine learning model at step 924.

FIG. 10-FIG. 17 illustrate an example of features engineering.

Figure 10:
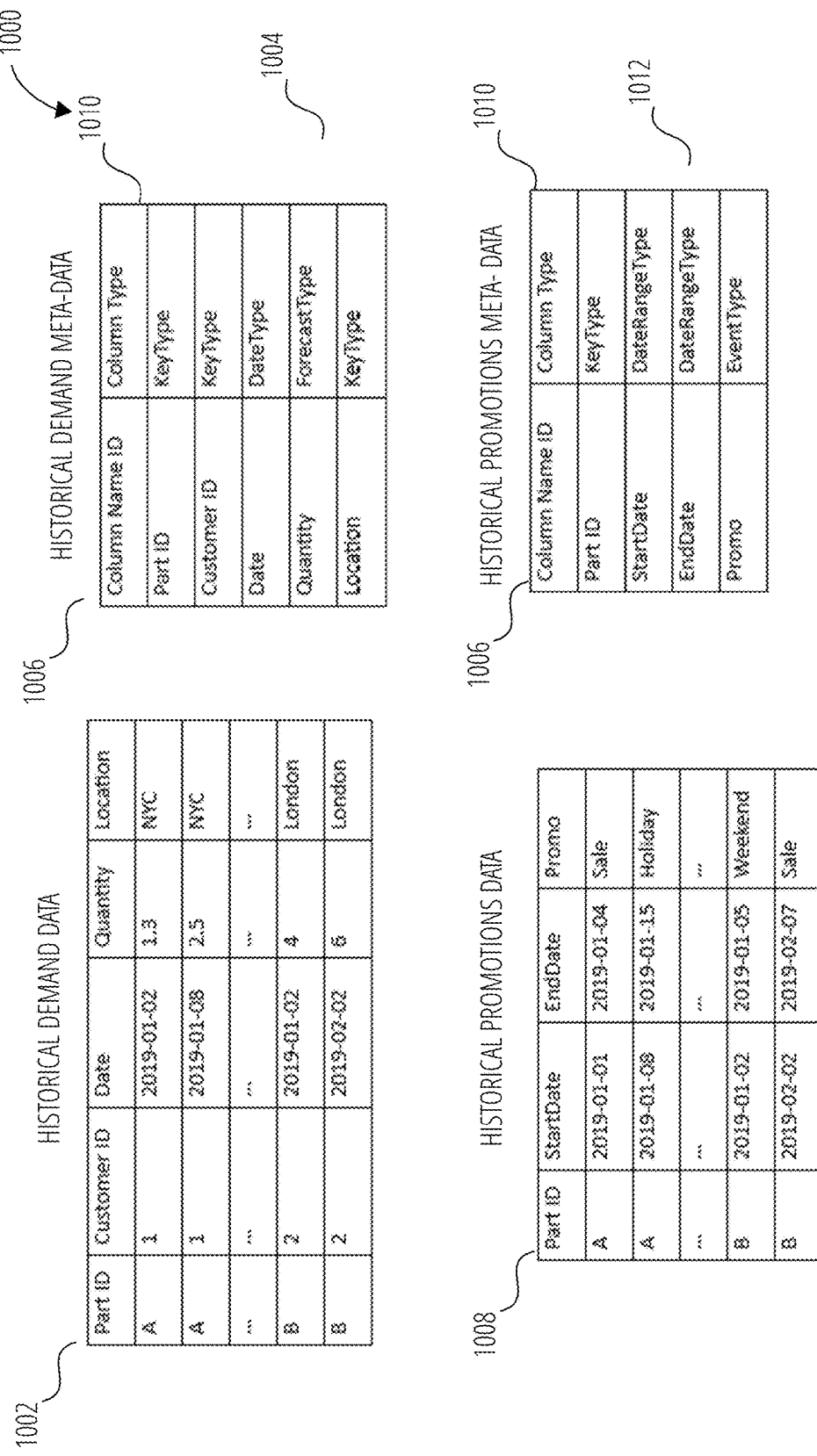
FIG. 10 illustrates data and meta-data for features engineering in accordance with one embodiment of an automated machine learning segmentation tool.

FIG. 10 illustrates data and meta-data for features engineering in accordance with one embodiment of an automated machine learning segmentation tool.

In the example shown in FIG. 10, there are two internal signals, one containing historical demand data 1002 and the other containing historical promotions data 1008. For each signal, two files are used: a data file and a meta-data file that defines the contents of the data file. Data and meta-data files are automatically ingested once each is uploaded.

A data file contains columns and values for a given signal, while the meta-data file (associated with the data file) contains the column names and their associated types. In some embodiments, a machine learning type can be defined in terms of allowable operations. For example, a category and a numerical quantity can both be represented by integers, but have different meanings and uses.

In FIG. 10, the data file historical demand data 1002 contains five columns: Part ID, Customer ID, Date, Quantity and Location. Each row of the historical demand data 1002 contains a value. The historical demand meta-data 1004 therefore contains five rows: one row for each column name ID 1006. Each column name ID 1006 has an associated column type 1010: Part ID has a column type "Key Type"; Customer ID has column type "Key Type" also; Date has a column type "Date Type"; Quantity has a column type "Forecast Type"; and Location has a column type "Key Type".

In FIG. 10, the data file historical promotions data 1008 contains four columns: Part ID, Start Date, End Date, and Promo. That is, for a given Part ID, the associated promotion has a start date and end date. For example, Part ID 'A' has a "Sale" promotion beginning Jan. 1, 2019 and ending Jan. 4, 2019. In addition, Part ID 'A' has a "Holiday" promotion beginning Jan. 8, 2019 and ending Jan. 15, 2019.

The historical promotions meta-data 1012 therefore contains four rows: one row for each column name ID 1506. Each column name ID 1006 has an associated column type 1010: Part ID has a column type "Key Type"; Start Date has column type "Date Range Type"; End Date has a column type "Date Range Type"; and Promo has a column type "Event Type". Note that event though "Start Date" and "End Date" are each dates, these are defined as having a column type 'Date Range Type' rather than "Date".

Once the data has been loaded into a database, external signals can be ingested based on data in the historical demand data 1002 and/or historical promotions data 1008. For example, weather signals can be uploaded since "Location" is a special column name that indicates a physical address when present in an uploaded file. As such, the database can be automatically populated with a data and meta-data file for the public weather data. Another example can include financial signals with respect to locations listed in historical promotions data 1008.

Figure 11:
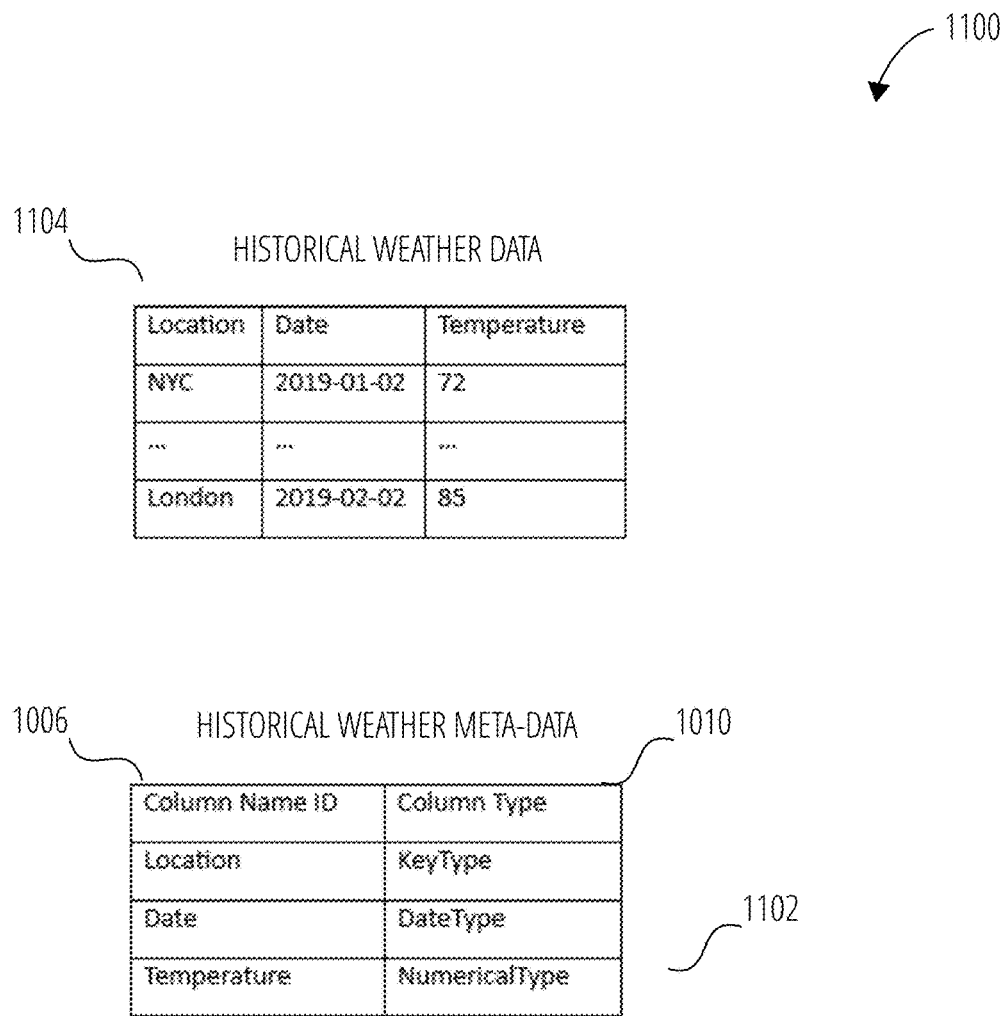
FIG. 11 illustrates historical weather data for features engineering in accordance with one embodiment of an automated machine learning segmentation tool.

FIG. 11 illustrates historical weather data 1104 and historical weather meta-data 1102 that has been automatically uploaded into a database, using the locations listed in historical demand data 1002 of FIG. 15.

In FIG. 11, data file historical weather data 1104 contains three columns: Location, Date and Temperature. That is, for a given location and date, a recorded temperature is provided. For example, the first row of historical weather data 1104 indicates a temperature of 72 F in New York City on Jan. 2, 2019. A subsequent row of historical weather data 1104 indicates a temperature of 85 F in London on Feb. 2, 2019.

The historical weather meta-data 1102 therefore contains three rows: one row for each column name ID 1006. Each column name ID 1006 has an associated column type 1010: "Location" has a column type "Key Type"; "Date" has column type "Date Type"; and "Temperature" has a column type "Numerical Type".

Step 1: Fusion

Once all the relevant data tables are in the database and all of the relevant types of the columns are known (via the meta-data tables), tables can be fused together. The process of fusion refers to the joining of several tables together using cross-domain knowledge.

Continuing with the examples shown in FIG. 10 and FIG. 11, the Historical Weather and Promotions tables will be joined to the Historical Demand data using the relevant key fields.

Exploding Date Ranges

Before joining the historical promotions data 1008, the date range is expanded so that a match can be made along all of the days during which the promotions occur. Afterward, the new expanded data set can be joined as if the promotions were given on a daily basis. The date range is expanded into a single date, so that each day within the date range is a separate row.

This is illustrated in FIG. 12, in which the original historical promotions data 1008 is shown next to the expanded historical promotions data 1202. In the first row 1204 of historical promotions data 1008, Part ID "A" has a "Sale" promo between Jan. 1, 2019 and Jan. 4, 2019. In the expanded historical promotions data 1202, this one row is expanded to four rows (although two are shown): "Sale" promo for Part ID "A", is listed for dates Jan. 1, 2019 (shown), Jan. 2, 2019 (shown), Jan. 3, 2019 (not shown) and Jan. 4, 2019 (not shown).

Similarly, in the second row 1206 of historical promotions data 1008, Part ID "A" has a "Holiday" promo between Jan. 8, 2019 and Jan. 15, 2019. In the expanded historical promotions data 1202, this one row is expanded to eight rows (although two are shown): "Holiday" promo for Part ID "A", is listed for dates Jan. 8, 2019 (shown), Jan. 9, 2019 (shown), Jan. 10, 2019 (not shown), Jan. 11, 2019 (not shown), Jan. 12, 2019 (not shown), Jan. 13, 2019 (not shown), Jan. 14, 2019 (not shown) and Jan. 15, 2019 (not shown).

The same expansion applies to all other rows of historical promotions data 1008. For example, in row 1208 of historical promotions data 1008, Part ID "B" has a "Weekend" promo between Jan. 2, 2019 and Jan. 5, 2019. In the expanded historical promotions data 1702, this one row is expanded to four rows (although two are shown): "Weekend" promo for Part ID "B", is listed for dates Jan. 2, 2019 (shown), Jan. 3, 2019 (shown), Jan. 4, 2019 (not shown) and Jan. 5, 2019 (not shown).

Similarly, in row 1210 of historical promotions data 1008, Part ID "B" has a "Sale" promo between Feb. 2, 2019 and Feb. 7, 2019. In the expanded historical promotions data 1202, this one row is expanded to six rows (although two are shown): "Sale" promo for Part ID "B", is listed for dates Feb. 2, 2019 (shown), Feb. 3, 2019 (shown), Feb. 4, 2019 (not shown), Feb. 5, 2019, Feb. 6, 2019 (not shown) and Feb. 7, 2019.

First Join Operation (Demand+Promo)

From the two meta-data tables historical demand meta-data 1004 and historical weather meta-data 1102, the historical demand table (i.e. historical demand data 1002) shares the Part ID Key and the Date column with the Historical Promotions table (i.e. historical promotions data 1008). These two table can be fuses (joined) based on these two common columns.

Figure 13:
FIG. 13 illustrates a fusion of data tables in features engineering in accordance with one embodiment of an automated machine learning segmentation tool.

This is illustrated in FIG. 13 where historical demand data 1002 is fused with expanded historical promotions data 1202 to give fused demand and promotion data 11 1302. Note in FIG. 13 that the Promotions were fused to the Demand data on 2019-01-02, even though that date did not exist anywhere in the original Promotions data. This is the sort of operation that makes fusion distinct from simple joining, as data can be combined and grouped together even if there are no exact key matchings.

Another example of this can be the joining of signals based on province or county, while the location itself might be an address or a city. A fusion operation such as that can combine geographically close signals together without the need for a user to define the relationship between them or the granularity of the location data.

Second Join Operation (Weather Data)

The Weather data can be joined to the fused demand and promotion data 11 1302. Given that the Historical demand data 1002 data and the historical weather data 1202 share Date and Location, the data can be joined at these two common columns. This is shown in FIG. 14 which illustrates a fusion of data tables 1400 in features engineering in accordance with one embodiment of an automated machine learning segmentation tool. The fully fused data is shown as 1402.

It should be noted that further join operations may take place for other external signals, such as, but not limited to financial data.

Step 2: Feature Generation

Once all of the relevant signals have been fused, extra features that may have additional predictive power, can be generated. Such a generation is made from i) the meta-data for the fused data, ii) the library of supported transformations; and iii) the fused data. This is shown in FIG. 15, in which are shown: fully fused data 1402, fused meta-data 1502 and a transformation library 1504.

From the fused meta-data 1502 and the transformation library 1504, it is possible to discover all of the combinations of columns that match the input types of various transformations as shown by transformation and column combinations 1602 in FIG. 16, which illustrates feature generation.

Now that all the applicable combinations of columns and transformations are known (from transformation and column combinations 1602), these can be applied to the fully fused data 1402 to get a final table, feature generated data 1604, that can be used to train machine learning models. For the sake of brevity in feature generated data 1604, some column names have been abbreviated to fit on a single line.

Step 3: Feature Selection

Once features have been generated, these can be filtered down to a smaller set of columns that have enhanced predictive power. This is done through a Feature Selection algorithm that can take a set of generated features and discard the ones with the least amount of information.

In some embodiments, any generated feature where the variance is low or null over the time period of interest, is eliminated. Subsequently, relationships between features and the quantity to forecast are modelled, in order to rank or score the generated features. In some embodiments, this approach includes estimating the mutual information between every feature and the quantity of interest, with a set of top features kept, in terms of their mutual information score. For example, this may be a set of top 30, 40 or more features. Such estimations can also be cascaded to provide a final reduced set of features (for example 15, 20, etc.) to feed to the machine learning models. Different machine learning model types also support different sizes of feature sets, so feature selection produces different sets and the machine learning models use different sets depending on how each model is handling different sizes of feature sets.

In some embodiments, feature selection is used to remove features that have noise, features that have similar values for all items, features that have values for a few items, etc. In some embodiments, feature selection is used to remove features in order to have a shorter training time or to avoid the curse of dimensionality.

In the example shown in FIG. 10-FIG. 16, assume, for example, that temperature, month and year have the highest predictive power. All of the columns of feature generated data 2104 are filtered out, with the exception of the key columns, the date column and ForecastType columns. This is shown in FIG. 17, which illustrates feature selection.

Discretion can also be used to select which features to use for subsequent machine learning. In addition, descriptive features can be converted to numerical data using algorithms known in the art (e.g. Wor2vec).

Step 4: Model Selection and Feature Optimization

FIG. 18 illustrates two scenarios for model selection.

In scenario 1 1802, the selected features data is fixed, as is the metric used to evaluate each segmentation. The selected features data is consumed by a series of machine learning models (machine learning model #1, machine learning model #2, etc.). Each machine learning model generates a segmentation (segmentation #1, segmentation #2, etc.), with each segmentation evaluated by its corresponding metric result. The segmentation method evaluates each machine learning method used from the segmentation library, and selects that which provides the best metric result.

In scenario 2 1804, the selected features data is fixed. However, a series of metrics is used to evaluate each segmentation generated by each machine learning model accessed from the segmentation library. For each machine learning model, a segmentation is generated and evaluated according to 'N' metrics (i.e. more than one metric). The segmentation method selects the segmentation (and hence machine learning model) which provides the best metric result.

FIG. 19 illustrates two more scenarios for model selection.

In each scenario, the segmentation method is applied to a series of fused data sets (fused data set #1, fused data set #2, etc.). The fused data sets may differ by the type of internal signals used to provide a fused data set and/or the type of external signals used to provide a fused data set. For example, fused data set #1 may include fusion of internal signals and external weather signals; fused data set #2 may include fusion of internal signals and external financial signals; fused data set #3 may include fusion of internal signals, external weather signals and external financial signals. For each fused data set, a set of features is selected.

In scenario 1 1902, each selected features set is used by the segmentation method according to scenario 1 (see FIG. 18) in which a single metric is used to evaluate each segmentation. Multiple series of segmentations are generated—that is, a series of segmentations is generated for fused data set #1, another series of segmentations is generated for fused data #2, and so on. Each segmentation from the multiple series of segmentations is evaluated by a metric. The segmentation method selects the segmentation (and hence machine learning model and fused data set) which provides the best metric result.

In scenario 2 1904, each selected features set is used by the segmentation method according to scenario 2 (see FIG. 18) in which multiple metrics are used to evaluate each segmentation by each machine learning model accessed from the segmentation library. Multiple series of segmentations are generated—that is, a series of segmentations is generated for fused data set #1, another series of segmentations is generated for fused data #2, and so on. Each segmentation from the multiple series of segmentations is evaluated by a metric. The segmentation method selects the segmentation (and hence the machine learning model, the metric and fused data set) which provides the best metric result.

FIG. 20 illustrates two scenarios for model selection in accordance with one embodiment of an automated machine learning segmentation tool.

In each scenario, a given fused data set is used to generate multiple sets of features, each of which generate a set of selected features. That is, a fused data set gives rise to multiple sets of selected features (not just one set of selected features). The generated sets of selected features are then used by the segmentation method according to one of two scenarios, to generate multiple segmentations, with each segmentation accorded a metric (scenario 1 2002) or multiple metrics (scenario 2 2004). This procedure occurs for each different set of the fused data.

In scenario 1 2002, each selected features set is used by the segmentation method according to scenario 1 (see FIG. 18) in which a single metric is used to evaluate each segmentation. Multiple series of segmentations are generated. Each segmentation from the multiple series of segmentations is evaluated by a metric. The segmentation method selects the segmentation (and hence the machine learning model, the selected features set and the fused data set) which provides the best metric result.

In scenario 2 2004, each selected features set is used by the segmentation method according to scenario 2 (see FIG. 18) in which multiple metrics are used to evaluate each segmentation by each machine learning model accessed from the segmentation library. Multiple series of segmentations are generated. Each segmentation from the multiple series of segmentations is evaluated by a metric. The segmentation method selects the segmentation (and hence the machine learning model, the metric the selected features set and the fused data set) which provides the best metric result.

Example

FIG. 21 illustrates a configuration 2100 in accordance with one embodiment of an automated machine learning segmentation tool. A web application 2110 equipped with an interactive job configuration is presented to a user. This application helps users to specify the items of interest and the attributes which should be leveraged in the segmentation process. In FIG. 21, a user selects data at 2102. The user has selected the data file "CruiserParts.data". Next, the user selects a manifest file at 2104, the manifest file is simply meta-data about the data file. The user has selected the manifest file "CruiserParts_Updated.mani". Finally, the user selects which items/attributes s/he wants to include, prior to features engineering, at 2106. The user has selected seven different attributes. In order to proceed with the configuration, the user simply has to press the 'Run' button at 2108. All of this information is sent to the machine learning database, prior to features engineering.

Figure 22:
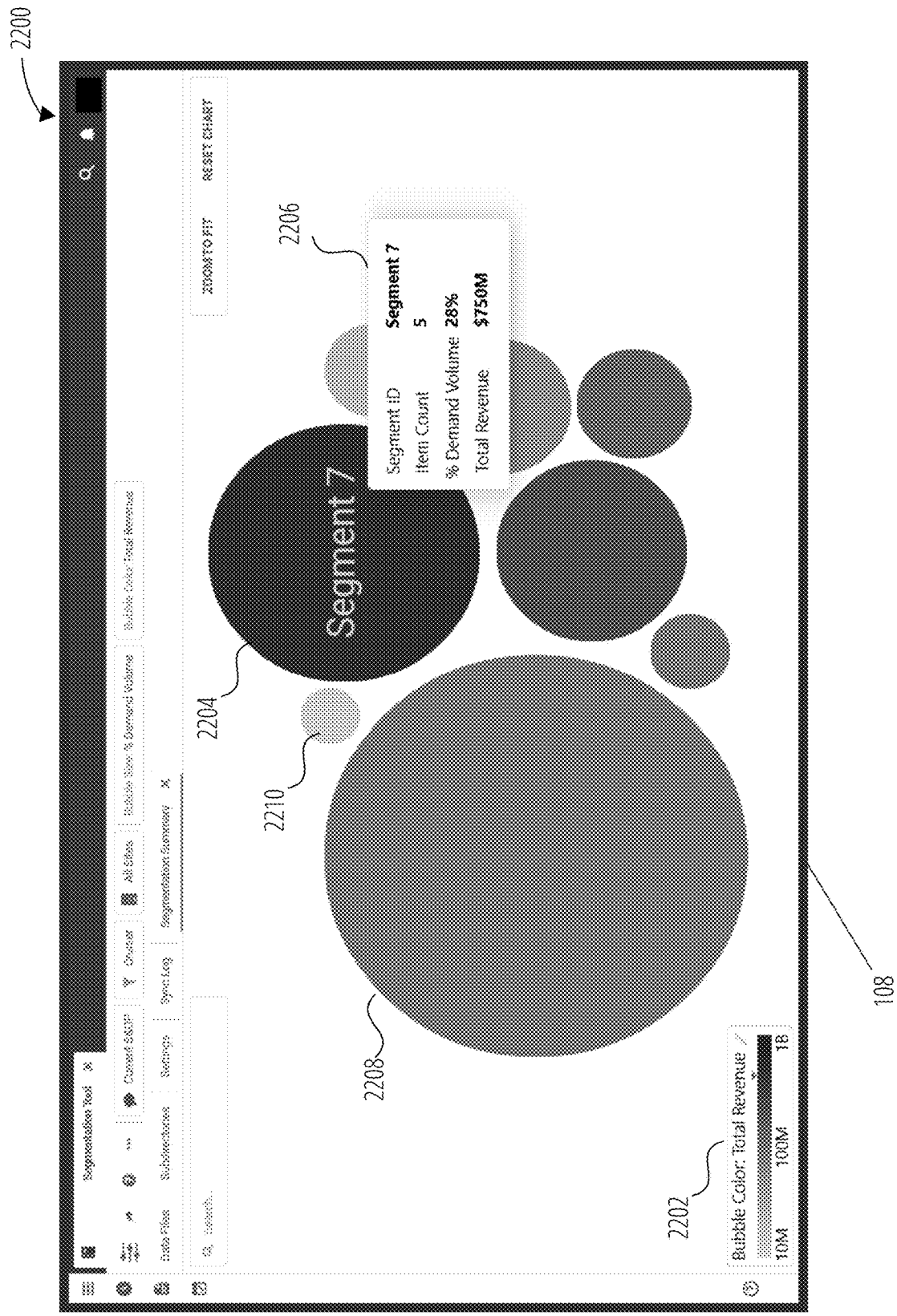
FIG. 22 illustrates segmentation of the data set used in FIG. 21, in accordance with one embodiment of an automated machine learning segmentation tool.

FIG. 22 illustrates segmentation 2200 of the data set used in FIG. 21, in accordance with one embodiment. The segmentation is viewed on the visualization visual user interface 108. The segmentation library included k-means and Gaussian mixture models. The best segments were based on Gaussian mixture model clustering.

In FIG. 22, segment 7 (item 2204) has been highlighted. Dialog box 2206, associated with segment 7, provides some basic information about the segment. For example, segment 7 consists of 5 items with a total revenue of $750M, and comprising 28% volume of the total demand of all items. According to the key 2202, the shade of a given segment is related to the total revenue of items within the segment; the darker the shade, the higher the revenue. Segment 7, which is the darkest of all the segments, therefore has the largest total revenue of all the segments. In contrast, segment 2208, the largest segment, has less revenue than that of segment 7 (since it has a lighter shade). Estimating according to key 2202, segment 2208 seems to have a revenue in the $100M-$120M range. Furthermore, since segment 2208 is larger than segment 7, it has more than 5 items grouped together. Exact values associated with segment 2208 can be found via a dialog box, which is not shown in FIG. 22. Finally, segment 2210 is the smallest of all segments, and the lightest—indicating that this group of items (which may include one item) has the lowest revenue among all segments. Exact details about segment 2210 can be found via a dialog box (not shown) via visual user interface 108.

It should be noted that the visualization can be presented in any manner so as to convey basic information about each segment to a user. For example, the colour key and size of each segment can represent any type of information that is useful to the user.

A user can drill down to further details about the segmentation by accessing a heat map shown on visual user interface 108.

Figure 23:
FIG. 23 illustrates a heatmap of the data set used in FIG. 21, in accordance with one embodiment of an automated machine learning segmentation tool.

FIG. 23 illustrates a heatmap 2300 of the data set used in FIG. 21, in accordance with one embodiment.

In FIG. 23, each row is an item; different blocks of items correspond to different segments shown in FIG. 22. Segment 7 shown in FIG. 22 has five items, and corresponds to the block or segment 2302. Similarly, segment 2304 contains 3 items; segment 2306 contains 3 items and segment 2308 contains 4 items.

In addition, the headers in heatmap 2300 are all attributes. In arriving at heatmap 2300, the user had chosen attribute 2310 (historical demand), but not the other four attributes (Description, Manufacturer, Category, Sub-category), for use in the segmentation engine. However, heatmap 2300 shows not just chosen attribute 2310, but also the other attributes that are relevant to attribute 2310. In general, heatmaps can display attributes, features, or any combination thereof.

Items within a segment are grouped together by the segmentation method. However, heatmap 2300 shows the variation of attributes and/or features within a segment. The color code is on a scale of 0 to 1; white is at one end of the scale and black is at the other end of the scale. Items that have the same shade for a given attribute, are very similar (in terms of that attribute). Items that have widely differing shades for a given attribute (e.g. white versus black) have very little in common for that attribute.

For the attribute 2310, Historical Demand (10/19/2017-10/19/2018), each block represents a month of historical demand. In segment 2302, part 31254742737 has pretty consistent historical demand across the 12-month period, with a slight change Jan 19/2018-Feb 19/2018 and Sept. 19/2018-Oct. 19/2018. This is elucidated from the level of shading for each of the twelve months making up the period of Oct. 19/2017 to Oct. 19/2018. On the other hand, part 7218063983, while having some consistency across the 12-month period (the majority of blocks are white or lightly shaded), its historical demand seems opposite that of part 31254742735. Furthermore, parts 7218063983 and 31254742835 seem to have less consistency in historical demand across the 12-month period; in addition, they seem to behave the opposite of each other (as seen by the shading).

In contrast, heatmap 2300 shows that the three items that make up segment 2304 have pretty similar historical demands across the twelve month period (the blocks are all similar shades of gray). Similarly, heatmap 2300 shows that the three items that make up segment 2306 have similar historical demands across the twelve month period (the blocks are all similar shades of gray)—except for the three-month period June 16/2018-Sept 16/208 for part 7797508004. Similarly, heatmap 2300 shows that the four items that make up segment 2306 have pretty similar historical demands across the twelve month period. Furthermore, it seems that the segmentation for these three sets makes sense—in that the items within each segment have similar historical demands through the 12-month period, and that overall, the level of shading in segment 2304 is somewhat darker than the corresponding level of shading in segment 2306, which in turn is darker than the corresponding level of shading in segment 2308 for the 12-month historical demand period.

A user may notice a disparity within segment 2302, in that the two parts 31254742735 and 31254742835 are more similar to each other (with respect to historical demand) than the other three items in segment 2302. The user may decide that segment 2302 should be split into two segments: one containing three parts, and the other containing parts 31254742735 and 31254742835, due to their differing pattern of historical demand. The user may go one step further, and decide to not only separate parts 31254742735 and 31254742835 from segment 2302, but join them to segment 2304, due to the similarity with the 12-month historical demand of each of the three parts that make up segment 2304.

Heatmap 2300 allows a user to see beyond the broad segmentation of the visualization shown in FIG. 22. Such granularity permits a user to interact with the segmentation and change groupings according to trends shown in the heatmap. If the user decides to change the groupings of items, the new information is sent to the segmentation method which generates a new segmentation (and associated heatmap) in a matter of minutes for the user to review.

Finally, in FIG. 23, variation of different attributes among items is also shown—although these attributes were not selected by the user at the outset of configuration. These attributes provide further information about historical demand. For example, an item Description, Manufacturer, Category and Sub-Category can provide further insight to a user.

For the Description attribute, items having the same shading have similar descriptions. For example, in segment 2302, parts 7218063979 and 7218063052 are both designated as white—meaning that they have very similar descriptions. The same applies to parts 721806983 and 31254742835; however, this pair differs from the pair 7218063979 and 7218063052. Therefore, the variation of Description within segment 2302 is provided by heatmap 2300. A similar analysis can be made for the other segments. One can also compare across segments—for example, parts 7218063979 and 7218063052 (in segment 2302) have a very similar description to that of part 4116709428 (segment 2304) and part 7797508004 (segment 2306). An intra-segment and inter-segment analysis can also be made, separately, for each of the attributes Manufacturer, Category and Sub-category.

While a set of blocks and shading gradations are used in heatmap 2300, it is understood that other forms of presentation can be used to convey variations in attributes within segments.

Figure 24:
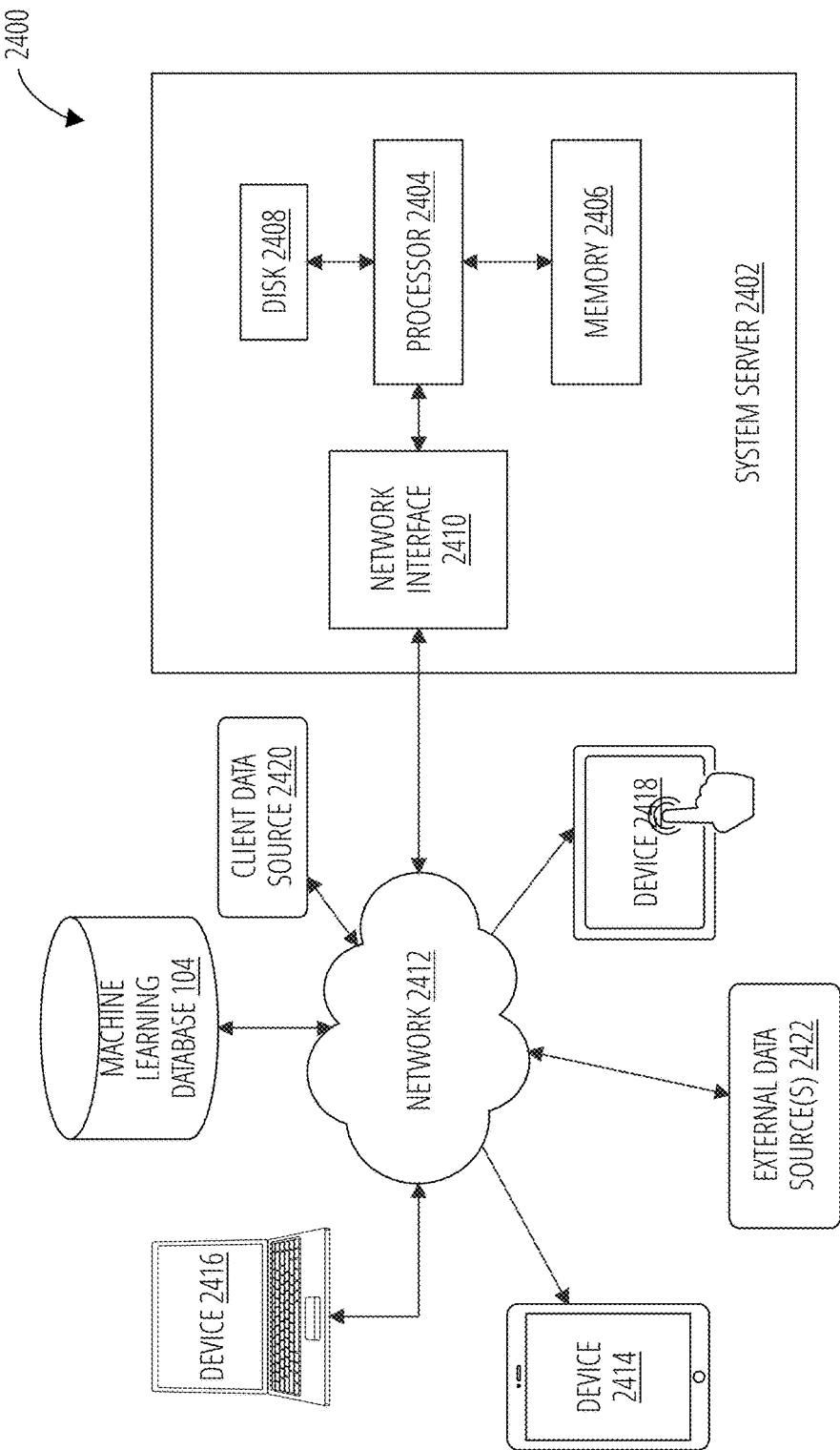
FIG. 24 illustrates a system in accordance with one embodiment of an automated machine learning segmentation tool.

FIG. 24 illustrates a system 2400 in accordance with one embodiment of an automated machine learning segmentation tool.

System 2400 includes a system server 2402, machine learning database 104, client data source 2420, one or more external data source(s) 2422 and one or more devices 2414, 2416 and 2418. While three devices are shown, fewer or more devices may be used. System server 2402 can include a memory 2406, a disk 2408, a processor 2404 and a network interface 2410. While one processor 2404 is shown, the system server 2402 can comprise one or more processors. In some embodiments, memory 2406 can be volatile memory, compared with disk 2408 which can be non-volatile memory. In some embodiments, system server 2402 can communicate with machine learning database 104, client data source 2420 and one or more external devices 2414, 2416 and 2418 and client data source 2420 via network 2412. While machine learning database 104 is illustrated as separate from system server 2402, machine learning database 104 can also be integrated into system server 2402, either as a separate component within system server 2402 or as part of at least one of memory 2406 and disk 2408.

System 2400 can also include additional features and/or functionality. For example, system 2400 can also include additional storage (removable and/or non-removable) including, but not limited to, magnetic or optical disks or tape. Such additional storage is illustrated in FIG. 24 by memory 2406 and disk 2408. Storage media can include volatile and nonvolatile, removable and non-removable media implemented in any method or technology for storage of information such as computer-readable instructions, data structures, program modules or other data. Memory 2406 and disk 2408 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 2400. Any such non-transitory computer-readable storage media can be part of system 2400.

Communication between system server 2402, machine learning database 104 and one or more external devices 2414, 2416 and 2418 via network 2412 can be over various network types. In some embodiments, the processor 2404 may be disposed in communication with network 2412 via a network interface 2410. The network interface 2410 may communicate with the network 2412. The network interface 2410 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). Generally, communication between various components of system 2400 may take place over hard-wired, cellular, Wi-Fi or Bluetooth networked components or the like. In some embodiments, one or more electronic devices of system 2400 may include cloud-based features, such as cloud-based memory storage.

Machine learning database 104 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database.

Machine learning database 104 may store metadata regarding the structure, relationships and meaning of data. This information may include data defining the schema of database tables stored within the data. A database table schema may specify the name of the database table, columns of the database table, the data type associated with each column, and other information associated with the database table. Machine learning database 104 may also or alternatively support multi-tenancy by providing multiple logical database systems which are programmatically isolated from one another. Moreover, the data may be indexed and/or selectively replicated in an index to allow fast searching and retrieval thereof. In addition, machine learning database 104 can store a number of machine learning models that are accessed by the system server 2402. A number of ML models can be used.

In some embodiments of machine learning, one or more clustering algorithms can be used. Non-limiting examples include k-means, fuzzy c-means, Gaussian mixture model clustering; spectral clustering; hierarchical clustering; mean-shift, density-based spatial clustering of applications with noise (DBSCAN) and BFR algorithm.

In some embodiments of machine learning, one or more anomaly detection algorithms can be used. Non-limiting examples include local outlier factor. In some embodiments of machine learning, neural networks can be used.

Client data source 2420 may provide a variety of raw data from a user, including, but not limited to: point of sales data that indicates the sales record of all of the client's products at every location; the inventory history of all of the client's products at every location; promotional campaign details for all products at all locations, and events that are important/relevant for sales of a client's product at every location.

External data source(s) 2422 may include sources that provide both historical and real-time information about climate, weather, financial indexes, web data, social media data, local holidays, festivals and events, and the like. Commercial weather and financial services can be purchased or accessed by other means.

Using the network interface 2410 and the network 2412, the system server 2402 may communicate with one or more devices 2414, 2416 and 2418. These devices 2414, 2416 and 2418 may include, without limitation, personal computer(s), server(s), various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like.

Using network 2412, system server 2402 can retrieve data from machine learning database 104, the one or more external data source(s) 2422 and client data source 2420. The retrieved data can be saved in memory 2406 or disk 2408. In some embodiments, system server 2402 also comprise a web server, and can format resources into a format suitable to be displayed on a web browser.

Once a preliminary machine learning result is provided to any of the one or more devices, a user can amend the results, which are re-sent to machine learning database 104, for further execution. The results can be amended by either interaction with one or more data files, which are then sent to machine learning database 104; or through a user interface at the one or more devices 2414, 2416 and 2418. For example, in device 2418, a user can amend the results using a graphical user interface.

Although the algorithms described above including those with reference to the foregoing flow charts have been described separately, it should be understood that any two or more of the algorithms disclosed herein can be combined in any combination. Any of the methods, modules, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner and can be used separately or in combination.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by a segmentation engine, data associated with each item of a plurality of items, each item associated with one or more attributes;
   engineering, by the segmentation engine, features associated with one or more signals, the one or more signals comprising either: i) one or more internal signals associated with the data; or ii) one or more internal signals associated with the data and one or more external signals;
   selecting, by the segmentation engine, a set of the engineered features;
   training, by the segmentation engine, a plurality of cluster-based machine learning models on the set of the engineered features;
   generating, by the segmentation engine, a plurality of segmentations of the plurality of items;
   selecting, by the segmentation engine, a first segmentation of the plurality of segmentations based on one or more cluster-based metrics;
   visualizing, by a visual user interface, the first segmentation of the plurality of segmentations; and
   amending, in response to a user input received via the visual interface, one or more segments within the first segmentation of the plurality of segmentations;
   wherein amending comprises:
      retraining the plurality of cluster-based machine learning models; and
      selecting, by the segmentation engine, a second segmentation of the plurality of amended segmentations based on one or more cluster-based metrics.

2. The computer-implemented method for segmentation of claim 1, wherein engineering features comprises:
   fusing, by the segmentation engine, data associated with the one or more signals, the fusing based on meta-data of each of the one or more signals; and
   generating, by the segmentation engine, a plurality of features based on one or more valid combinations that match an input of a transformation, the transformation forming part of a library of transformations.

3. The computer-implemented method for segmentation of claim 2, further comprising:
   fusing, by the segmentation engine, data associated with the one or more signals to produce a plurality of fused data sets;
   generating, by the segmentation engine, a plurality of features for each fused data set;
   selecting, by the segmentation engine, a set of features for each fused data set, thereby generating a plurality of sets of selected features;
   consuming, by each of the at least one cluster-based machine learning models, the plurality of sets of selected features;
   generating, by each of the cluster-based machine learning models, a respective segmentation corresponding to each set of selected features; and
   evaluating, by the segmentation engine, each respective segmentation corresponding to each set of selected features, based on the one or more cluster-based metrics.

4. The computer-implemented method for segmentation of claim 1, wherein:
   the plurality of cluster-based machine learning models is selected from k-means, fuzzy c-means, Gaussian mixture model clustering; spectral clustering; hierarchical clustering, mean-shift, density-based spatial clustering of applications with noise (DBSCAN) and BFR algorithm; and
   each of the metrics from the one or more cluster-based metrics is selected from at least one of Davies-Bouldin (DB) index, Dunn index and Silhouette coefficient.

5. The computer-implemented method for segmentation of claim 1, wherein the one or more external signals is selected from weather and financial data.

6. A system comprising:
   a processor; and
   a memory storing instructions that, when executed by the processor, configure the system to:
      receive, by a segmentation engine, data associated with each item of a plurality of items, each item associated with one or more attributes;
      engineer, by the segmentation engine, features associated with one or more signals, the one or more signals comprising either: i) one or more internal signals associated with the data; or ii) one or more internal signals associated with the data and one or more external signals;
      select, by the segmentation engine, a set of the engineered features;
      train, by the segmentation engine, a plurality of cluster-based machine learning models on the set of the engineered features;
      generate, by the segmentation engine, a plurality of segmentations of the plurality of items;
      select, by the segmentation engine, a first segmentation of the plurality of segmentations based on the one or more cluster-based metrics;
      visualize, by a visual user interface, the first segmentation of the plurality of segmentations; and
      amend, in response to user input received via the visual interface, one or more segments within the first segmentation of the plurality of segmentations;
      wherein amending comprises:
         retraining the plurality of cluster-based machine learning models; and selecting, by the segmentation engine, a second segmentation of the plurality of amended segmentations based on one or more cluster-based metrics.

7. The system of claim 6, wherein the instructions further configure the system to:
fuse, by the segmentation engine, data associated with the one or more signals, fusing based on meta-data of each of the one or more signals; and
generate, by the segmentation engine, a plurality of features based on one or more valid combinations that match an input of a transformation, the transformation forming part of a library of transformations.

8. The system of claim 7, wherein the instructions further configure the system to:
fuse, by the segmentation engine, data associated with the one or more signals to produce a plurality of fused data sets;
generate, by the segmentation engine, a plurality of features for each fused data set;
select, by the segmentation engine, a set of features for each fused data set, thereby generating a plurality of sets of selected features;
consume, by each of the at least one cluster-based machine learning models, the plurality of sets of selected features;
generate, by each of the cluster-based machine learning models, a respective segmentation corresponding to each set of selected features; and
evaluate, by the segmentation engine, each respective segmentation corresponding to each set of selected features, based on the one or more cluster-based metrics.

9. The system of claim 6, wherein:
the plurality of cluster-based machine learn models is selected from k-means, fuzzy c-means, Gaussian mixture model clustering; spectral clustering; hierarchical clustering, mean-shift, density-based spatial clustering of applications with noise (DBSCAN) and BFR algorithm; and
each of the metrics from the one or more cluster-based metrics is selected from at least one of Davies-Bouldin (DB) index, Dunn index and Silhouette coefficient.

10. The system of claim 6, wherein the one or more external signals is selected from weather and financial data.

11. A non-transitory computer-readable storage medium for segmenting a plurality of items into a plurality of segments, each segment consisting a subset of the plurality of items, the computer-readable storage medium including instructions that when executed by a computer, cause the computer to:
receive, by a segmentation engine, data associated with each item of the plurality of items, each item associated with one or more attributes;
engineer, by the segmentation engine, features associated with one or more signals, the one or more signals comprising either: i) one or more internal signals associated with the data; or ii) one or more internal signals associated with the data and one or more external signals;
select, by the segmentation engine, a set of the engineered features;
train, by the segmentation engine, a plurality of cluster-based machine learning models on the set of the engineered features;
generate, by the segmentation engine, a plurality of segmentations of the plurality of items;

select, by the segmentation engine, a first segmentation of the plurality of segmentations based on the one or more cluster-based metrics;
visualize, by a visual user interface, the first segmentation of the plurality of segmentations; and
amend, in response to user input received via the visual interface, one or more segments within the first segmentation;
wherein amending comprises:
retraining the plurality of cluster-based machine learning models; and
selecting, by the segmentation engine, a second segmentation of the plurality of amended segmentations based on one or more cluster-based metrics.

12. The computer-readable storage medium of claim 11, wherein the instructions further configure the computer to:
fuse, by the segmentation engine, data associated with the one or more signals, fusing based on meta-data of each of the one or more signals; and
generate, by the segmentation engine, a plurality of features based on one or more valid combinations that match am input of a transformation, the transformation forming part of a library of transformations.

13. The computer-readable storage medium of claim 12, wherein the instructions further configure the computer to:
fuse, by the segmentation engine, data associated with the one or more signals to produce a plurality of fused data sets;
generate, by the segmentation engine, a plurality of features for each fused data set;
select, by the segmentation engine, a set of features for each fused data set, thereby generating a plurality of sets of selected features;
consume, by each of the at least one cluster-based machine learning models, the plurality of sets of selected features;
generate, by each of the cluster-based machine learning models, a respective segmentation corresponding to each set of selected features; and
evaluate, by the segmentation engine, each respective segmentation corresponding to each set of selected features, based on the one or more cluster-based metrics.

14. The computer-readable storage medium of claim 11, wherein:
the plurality of cluster-based machine learn models is selected from k-means, fuzzy c-means, Gaussian mixture model clustering; spectral clustering; hierarchical clustering, mean-shift, density-based spatial clustering of applications with noise (DBSCAN) and BFR algorithm; and
each of the metrics from the one or more cluster-based metrics is selected from at least one of Davies-Bouldin (DB) index, Dunn index and Silhouette coefficient.

15. The computer-readable storage medium of claim 11, wherein the one or more external signals is selected from weather and financial data.

16. The computer-implemented method of claim 1, further comprising:
generating a new segmentation by amending at least one of the plurality of items and attributes.

17. The computer-implemented method of claim 1, wherein amending the one or more segments within the segmentation comprises at least one of:
any combination of splitting one or more segments;
any combination of merging one or more segments;
creating one or more segments;

deleting one or more segments;
adding one or more pairwise item constraints;
removing one or more pairwise item constraints;
assigning an item to a segment; and
removing an item from a segment.

18. The system of claim 6, wherein the instructions further configure the system to:
generate a new segmentation by amending at least one of the plurality of items and attributes.

19. The system of claim 6, wherein amending the one or more segments within the segmentation comprises at least one of:
any combination of splitting one or more segments;
any combination of merging one or more segments;
creating one or more segments;
deleting one or more segments;
adding one or more pairwise item constraints;
removing one or more pairwise item constraints;
assigning an item to a segment; and
removing an item from a segment.

20. The computer-readable storage medium of claim 11, wherein the instructions further configure the system to:
generate a new segmentation by amending at least one of the plurality of items and attributes.

21. The computer-readable storage medium of claim 11, wherein amending the one or more segments within the segmentation comprises at least one of:
any combination of splitting one or more segments;
any combination of merging one or more segments;
creating one or more segments;
deleting one or more segments;
adding one or more pairwise item constraints;
removing one or more pairwise item constraints;
assigning an item to a segment; and
removing an item from a segment.

* * * * *